United States Patent [19]
Watanabe et al.

[11] Patent Number: 5,263,317
[45] Date of Patent: Nov. 23, 1993

[54] EXHAUST GAS PURIFYING APPARATUS FOR AUTOMOBILE DIESEL ENGINE

[75] Inventors: Shigeo Watanabe, Gifu; Katsuharu Kinoshita, Kagamihara; Niichi Hayashi, Hashima; Hisashi Matsunaga, Nagoya, all of Japan

[73] Assignee: Kabushiki Kaisha Nagao Kogyo, Nagoya, Japan

[21] Appl. No.: 953,194

[22] Filed: Sep. 29, 1992

Related U.S. Application Data

[62] Division of Ser. No. 692,724, Apr. 29, 1991, abandoned.

[30] Foreign Application Priority Data

May 25, 1990 [JP] Japan ................ 2-135569
Aug. 25, 1990 [JP] Japan ................ 2-222818

[51] Int. Cl.$^5$ .................................................. F01N 3/02
[52] U.S. Cl. ................................ 60/275; 55/DIG. 30; 96/22; 96/32; 96/51
[58] Field of Search ................ 60/275; 55/112, 121, 55/DIG. 30

[56] References Cited

U.S. PATENT DOCUMENTS

| | | | |
|---|---|---|---|
| 2,244,279 | 6/1941 | White | 55/151 |
| 3,400,513 | 9/1968 | Boll | 55/152 |
| 3,511,030 | 5/1970 | Hall | 55/138 |
| 3,558,286 | 1/1971 | Gourdine | 55/138 |
| 3,577,705 | 5/1971 | Sharlit | 55/110 |
| 4,588,423 | 5/1986 | Gillingham | 55/138 |
| 4,657,567 | 4/1987 | Callgren | 55/121 |
| 4,823,549 | 4/1989 | Moser | 60/275 |
| 4,871,515 | 10/1989 | Reichle | 60/275 |
| 4,874,407 | 10/1989 | Lefkowitz | 55/DIG. 30 |
| 5,053,914 | 10/1991 | Wessel | 55/DIG. 30 |

FOREIGN PATENT DOCUMENTS

| | | |
|---|---|---|
| 0083845 | 7/1983 | European Pat. Off. . |
| 668644 | 12/1938 | Fed. Rep. of Germany ........ 55/121 |
| 3019991 | 12/1981 | Fed. Rep. of Germany . |
| 3238794 | 4/1984 | Fed. Rep. of Germany . |
| 3305601 | 8/1984 | Fed. Rep. of Germany . |
| 3702469 | 8/1988 | Fed. Rep. of Germany . |
| 3724511 | 2/1989 | Fed. Rep. of Germany . |
| 3371110 | 3/1989 | Fed. Rep. of Germany . |
| 1557157 | 7/1989 | Fed. Rep. of Germany . |
| 3820740 | 12/1989 | Fed. Rep. of Germany . |
| 12011 | 2/1981 | Japan .................................. 60/275 |
| 581971 | 1/1977 | U.S.S.R. ............................. 55/121 |
| 413800 | 7/1934 | United Kingdom ................ 55/150 |
| 848446 | 9/1973 | United Kingdom ................ 55/138 |

*Primary Examiner*—Douglas Hart
*Attorney, Agent, or Firm*—Oblon, Spivak, McClelland, Maier & Neustadt

[57] ABSTRACT

Disclosed is an exhaust gas purifying apparatus for an automobile diesel engine including a pair of electrodes disposed at a predetermined interval in an exhaust path of an automobile diesel engine, and a high voltage power source for applying a high voltage to the pair of electrodes whereby an electric field is generated in a space between the pair of electrodes so as to collect diesel particulates. Since the diesel particulates emitted from a diesel engine are charged heavily in negative, and since the exhaust gas purifying apparatus forms an electric field between the pair of electrodes, the diesel particulates are collected on one of the pair of electrodes. Hence, in accordance with the exhaust gas purifying apparatus, it is possible to purify the exhaust gas without substantially increasing the exhaust gas pressure loss of the diesel engine, without deteriorating the output of the diesel engine resulting from the pressure loss and without deteriorating the combustion reaction in cylinders of the diesel engine. In addition, it is possible to down-size the exhaust gas purifying apparatus remarkably compared with a conventional apparatus employing a ceramic filter.

6 Claims, 25 Drawing Sheets

EXHAUST GAS PURIFYING APPARATUS FOR AUTOMOBILE DIESEL ENGINE

This application is a division of application Ser. No. 07/692,724, filed on Apr. 29, 1991, now abandoned.

BACKGROUND OF THE INVENTION

1. Field of the Invention

The present invention relates to an exhaust gas purifying apparatus for an automobile diesel engine.

2. Description of the Prior Art

Diesel particulates (i.e., soot and dust particles) are contained in exhaust gases emitted from diesel engines of buses, tracks or the like. The diesel particulates have been causing serious problems recently, such as environmental contaminations and damages to human health. In order to solve the problems, the combustion manner of the diesel engines has been improved, or a ceramic filter has been employed.

However, the diesel engines are subjected to a wide variety of operations, such as cold starting, hill climbing, heavy loading or the like. Accordingly, it is hard to reduce the diesel particulates sharply by improving the combustion manner.

On the other hand, when the ceramic filter is employed to adsorb the diesel particulates, the exhaust gas pressure loss increases and the engine efficiency decreases by the pressure loss. In particular, in the case that an amount of the adsorbed diesel particulates increases, the exhaust gas pressure loss increases in an accelerating manner, and accordingly the output of the diesel engine and the combustion characteristic deteriorate, thereby generating extra diesel particulates. In addition, the ceramic filter must be enlarged in order to reduce the exhaust gas pressure loss. Hence, it is difficult to put the ceramic filter into a practical application in view of the cost and the space.

SUMMARY OF THE INVENTION

The present invention has been developed in view of the problems described above. It is therefore an object of the present invention to provide an exhaust gas purifying apparatus for an automobile diesel engine which causes less exhaust gas pressure loss and offers an easy handling for separated soot and dust particles.

An exhaust gas purifying apparatus for a diesel engine according to the present invention is an application of the electric precipitation principle, and separates diesel particulates contained in an exhaust gas from the exhaust gas.

Namely, the diesel particulates emitted from a diesel engine are charged heavily in negative because of the combustion reaction and the air flow in a cylinder. The exhaust gas purifying apparatus according to the present invention forms an electric field between the pair of electrodes, thereby collecting the diesel particulates on one of the pair of electrodes. In addition, when a corona discharge is generated by a voltage applied to the pair of electrodes, the diesel particulates can be further charged, and they can be collected more securely. Hence, in accordance with the exhaust gas purifying apparatus of the present invention, it is possible to purify the exhaust gas without substantially increasing the exhaust gas pressure loss of the diesel engine, without deteriorating the output of the diesel engine resulting from the pressure loss and without deteriorating the combustion reaction in the cylinder.

On the other hand, in the conventional exhaust gas purifying apparatus, the clogged ceramic filter has resulted in the increasing exhaust gas pressure loss and the deteriorating combustion ability. Accordingly, the horse power has deteriorated, and the fuel injection amount must be further increased to recover the deteriorating horse power. As a result, the combustion ability has deteriorated further, and the diesel particulates have emitted more.

However, the exhaust gas purifying apparatus of the present invention can solve the dilemma. Namely, the exhaust gas purifying apparatus of the present invention can be down-sized remarkably when comparing it with the conventional one employing the ceramic filter.

In a first aspect of the present invention, the exhaust gas purifying apparatus includes a cylindrical member constituting one of the pair of electrodes, an electrode member disposed in a central portion of the cylindrical member in a manner extending in an axial direction and constituting another one of the pair of electrodes, and a scraper for scraping diesel particulates layer depositing on an inner surface of the cylindrical member, the scraper rotating along an inner surface of the cylindrical member relatively with respect to the cylindrical member. With the construction, the diesel particulates cleaning operation can be done safely and easily.

In the first aspect of the present invention, the exhaust gas purifying apparatus may include a collector container detachably installed to a lower part of the cylindrical member so as to collect diesel particulates. The collector container can make the diesel particulates discharge operation easier. Further, the scraper may be kept to rotate while supplying electricity to the collector electrodes and collecting the diesel particulates. With this arrangement, the cylindrical member can be down-sized in a radial direction because the diesel particulates hardly deposit on the collector electrodes. Furthermore, the influence of the electric field liable to concentrate on the scraper can be dispersed to the whole of the space (i.e., the collector space) in the cylindrical member.

In a second aspect of the present invention, the exhaust gas purifying apparatus includes a container constituting one of the pair of electrodes, an electrode member disposed in the container and constituting another one of the pair of electrodes, and a vibrator for continuously giving vibration to the container from an outside of the container whereby diesel particulates depositing on an inner surface of the cylindrical member are dropped. With the construction, the diesel particulates cleaning operation can be done safely and easily when the exhaust gas purifying apparatus is disposed under an automobile floor where an operator is troubled to carry out the cleaning operation.

In the second aspect of the present invention, the exhaust gas purifying apparatus may include a collector container detachably installed to a lower part of the container so as to collect the diesel particulates. With the container, the diesel particulates cleaning operation is made much easier. The vibrator may be an electric continuous vibrator having a motor as a driving source, an electromagnetic continuous vibrator having an electromagnet as a driving source, an ultrasonic continuous vibrator having an ultrasonic oscillator as a driving source or the like. The vibrator may give a plurality of continuous vibrations to the container at predetermined intervals. When the collector electrodes start to collect the diesel particulates, the vibrator may vibrate the container simultaneously in order to facilitate to drop the diesel particulates, or the electrostatic collecting of the diesel particulates and the vibration dropping of the diesel particulates may be carried out by turns. Further, the exhaust gas purifying apparatus may include a vibrator controller for actuating the vibrator when a current flowing between the pair of electrodes exceeds a predetermined level. With the vibrator controller, the diesel particulates can be dropped at appropriate intervals.

In a third aspect of the present invention, the exhaust gas purifying apparatus includes an insulator insulating the pair of electrodes electrically, and an air introducing member for supplying fresh air onto a surface of the insulator. With the construction, the air introducing member supplies fresh air onto the surface of the insulator, and the surface of the insulator is inhibited from contacting with an exhaust gas containing the diesel particulates. Accordingly, the cleanliness of the surface of the insulator can be maintained.

Namely, no leakage current leaking over the surface of insulator is not caused by the diesel particulates depositing on the surface of the insulator. Consequently, it is possible to avoid the problem, i.e., the deteriorating diesel particulates removing efficiency, resulting from the reduction in the current required to charge the diesel particulates by discharge or the reduction in the current required to deposit the diesel particulates on a surface of the electrodes by electrostatic force. In the third aspect of the present invention, the air introducing member may be disposed in the insulator.

In a fourth aspect of the present invention, the exhaust gas purifying apparatus includes an insulator insulating the pair of electrodes electrically, and a diesel particulates burning member disposed adjacent to a surface of the insulator so as to ignite and burn diesel particulates depositing on a surface of the insulator. The insulation of the insulator tends to deteriorate due to electrically conductive diesel particulates depositing on the surface of the insulator. However, with the construction, it is possible to inhibit the insulation from deteriorating. Accordingly, it is possible to inhibit the deteriorations of the diesel particulates charging efficiency and the diesel particulates collecting efficiency due to the deteriorated insulation of the insulator.

In the fourth aspect of the present invention, the diesel particulates burning member may include a heater (i.e., an electric resistor heating means) disposed in the insulator. With the heater, the installation space can be saved when compared with the construction in which the diesel particulates burning member and the insulator are disposed independently, and accordingly the heating efficiency can be improved.

Further, in the fourth aspect of the present invention, the exhaust gas purifying apparatus may include an oxygen supplying means for supplying at least one of air and an exhaust gas into the exhaust path when igniting the diesel particulates. With the oxygen supplying means, the oxygen for burning the diesel particulates will not be insufficient. Particularly, when the diesel engine itself is employed as the oxygen supplying means, it is not necessary to employ a special oxygen supplying means additionally.

Furthermore, in the fourth aspect of the present invention, the exhaust gas purifying apparatus may include an insulator contamination detector member for detecting contamination of the insulator in accordance with a leakage current resulting from a check voltage applied to the pair of electrodes, check voltage which is in a range free from causing a corona discharge. In accordance with the judgment made by the insulator contamination detector, the diesel particulates burning member is actuated. Hence, the diesel particulates can be burned at appropriate intervals.

In a fifth aspect of the present invention, the exhaust gas purifying apparatus includes a diesel particulates burning member disposed adjacent to a surface of the pair of electrodes so as to ignite and burn diesel particulates depositing on a surface of the pair of electrodes. The construction obviates the diesel particulates recovery operation or throw-away operation. Hence, the maintenance of the exhaust gas purifying operation can be done with ease.

In the fifth aspect of the present invention, the exhaust gas purifying apparatus may include an oxygen supplying means for supplying at least one of air and an exhaust gas into the exhaust path when igniting the diesel particulates. With the oxygen supplying means, the oxygen for burning the diesel particulates will not be insufficient. Particularly, when the diesel engine itself is operated as the oxygen supplying means, it is not necessary to employ a special oxygen supplying means additionally because the oxygen content ratio, or the excess air ratio, of the exhaust gas emitted from the diesel engine is usually large. Accordingly, the exhaust gas purifying apparatus can be simplified remarkably.

Further, in the fifth aspect of the present invention, the exhaust gas purifying apparatus may include a diesel particulates burning member controller for actuating the diesel particulates burning member when a current flowing between the pair of electrodes exceeds a predetermined level. With the diesel particulates burning member controller, the diesel particulates can be burned at appropriate intervals.

In a sixth aspect of the present invention, the exhaust gas purifying apparatus may include a current detecting means for detecting a current flowing between the pair of electrodes, and an applied voltage controller for controlling a voltage applied to the pair of electrodes in accordance with a difference between a flowing current detected and a target flowing current, thereby minimizing the difference. With the construction, it is possible to solve the following problems.

That is, in an operation mode of the exhaust gas purifying apparatus in which a constant voltage is applied to the pair of electrodes, the diesel particulates charging rate and the diesel particulates collecting efficiency fluctuate depending on the emission of the diesel particulates from a diesel engine and the deposition of the diesel particulates on the pair of electrodes. Further, the current flowing between the pair of electrodes fluctuates depending on the thickness variation of the diesel particulates depositing on the pair of electrodes even when a constant voltage is applied to the pair of electrodes. Consequently, when the current actually flowing between the electrodes is larger than an optimum current, NOx and the electricity consumption increase, and eventually the electrodes break. Contrarily, when the current actually flowing between the electrodes is smaller than an optimum current, the diesel particulates charging efficiency and the collecting efficiency deteriorate.

In the sixth aspect of the present invention, the exhaust gas purifying apparatus includes the applied voltage controller which controls a voltage applied to the pair of electrodes in accordance with a difference between a current actually supplied and a target current so as to minimize the difference. Therefore, it is possible to carry out the diesel particulates collecting operation favorably regardless of the impedance variation resulting from the diesel particulates depositing on the pair of electrodes. Accordingly, it is also possible to avoid troubles due to an excess supply of electricity.

Further, in the sixth aspect of the present invention, the applied voltage controller may calculate the target flowing current to be flown between the pair of electrodes in accordance with an operation condition of an automobile diesel engine, and control the voltage to be applied to the pair of electrodes in accordance with the target flowing current calculated.

In a seventh aspect of the present invention, the exhaust gas purifying apparatus comprises a pair of discharge electrodes disposed in an exhaust path of an automobile diesel engine, a pair of collector electrodes disposed downstream with respect to the pair of discharge electrodes in the exhaust path, and a high voltage power source for causing a discharge between the pair of discharge electrodes so as to charge diesel particulates in an exhaust gas, and for forming a non-discharge electric field between the pair of collector electrodes so as to collect the charged diesel particulates onto the collector electrodes. Thus, the diesel particulates are first charged by the discharge electrodes disposed upstream, and thereafter, without forming a corona discharge, the charged diesel particulates are collected by the collector electrodes disposed downstream. With the construction, it is possible to improve the electricity consumption and the conversion of the exhaust gas purifying apparatus.

On the other hand, when only a pair of electrodes carry out the charging of the diesel particulates by using a corona discharge as well as the electrostatic collecting of the diesel particulates, an interval between the pair of electrodes must be set to a larger dimension and a discharge voltage must also be set to a larger value. The interval between the pair of the electrodes must be enlarged in order to inhibit the diesel particulates from depositing between the pair of electrodes and short-circuiting the pair of electrodes. In addition, a corona discharge current tends to concentrate on part of a certain area (hereinafter referred to as a discharge area), and accordingly the diesel particulates which do not pass near the discharge area or adjacent to the discharge area are not charged. Hence, the non-charged diesel particulates are evacuated without depositing on the pair of electrodes, and the exhaust gas conversion deteriorates. When the discharge voltage is raised to increase the discharge current, the situation is improved a little bit. However, the electricity consumption increases. Further, most of the discharge current increased concentrates on the discharge area where the discharge current flows with ease originally, and overheats the pair of electrodes placed in the discharge area. Since the unnecessary concentration of the discharge current and the overheated electrodes result in the oxidation of nitrogen, or increasing NOx, and the reduced electrodes life.

However, in the seventh aspect of the present invention, the exhaust gas is passed between the discharge electrodes carrying out a corona discharge thereby charging the diesel particulates in a concentrated manner, and thereafter the charged diesel particulates are collected by the pair of collector electrodes electrostatically. Hence, the charging rate of the diesel particulates can be improved, and consequently the exhaust gas conversion can be improved. In addition, the interval between the discharge electrodes can be reduced, and accordingly the voltage applied for a corona discharge can be reduced. Further, it is not necessary to apply a voltage to the collector electrodes as high as a corona voltage. Therefore, the electricity can be saved. A space for a corona discharge can be thus reduced, and the NOx generation can also be reduced. The diesel particulates naturally deposit on one of the discharge electrodes. However, the diesel particulates move over a small average distance to the surface of the one of discharge electrodes because the diesel particulates are the ones immediately after being charged, and the flow rate of the diesel particulates can be increased freely. Hence, it is possible to reduce the diesel particulates deposition on the discharge electrodes.

In the seventh aspect of the present invention, the pair of discharge electrodes and the pair of collector electrodes may be formed integrally, and an interval between the pair of discharge electrodes may be made smaller than an interval between the pair of collector electrodes. With the construction, it is possible to get rid of the insulation between the discharge electrodes and the collector electrodes, and to simplify a construction for supporting the electrodes. Accordingly, the high voltage power source may be one which generates a single voltage.

Further, in the seventh aspect of the present invention, the pair of discharge electrodes may include a nozzle portion for throttling the exhaust gas and an electrode rod disposed in a central portion of the nozzle portion in an axial direction. With the pair of discharge electrodes, it is possible to concentrate a corona discharge in a small space in the nozzle portion and flow all of the exhaust gas therein. As a result, the exhaust gas comes to flow at a high speed, and blows away the diesel particulates depositing on an inner surface of the nozzle portion. Thus, the high speed exhaust gas flow inhibits the diesel particulates from short-circuiting between the discharge electrodes, and cools the pair of discharge electrodes.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
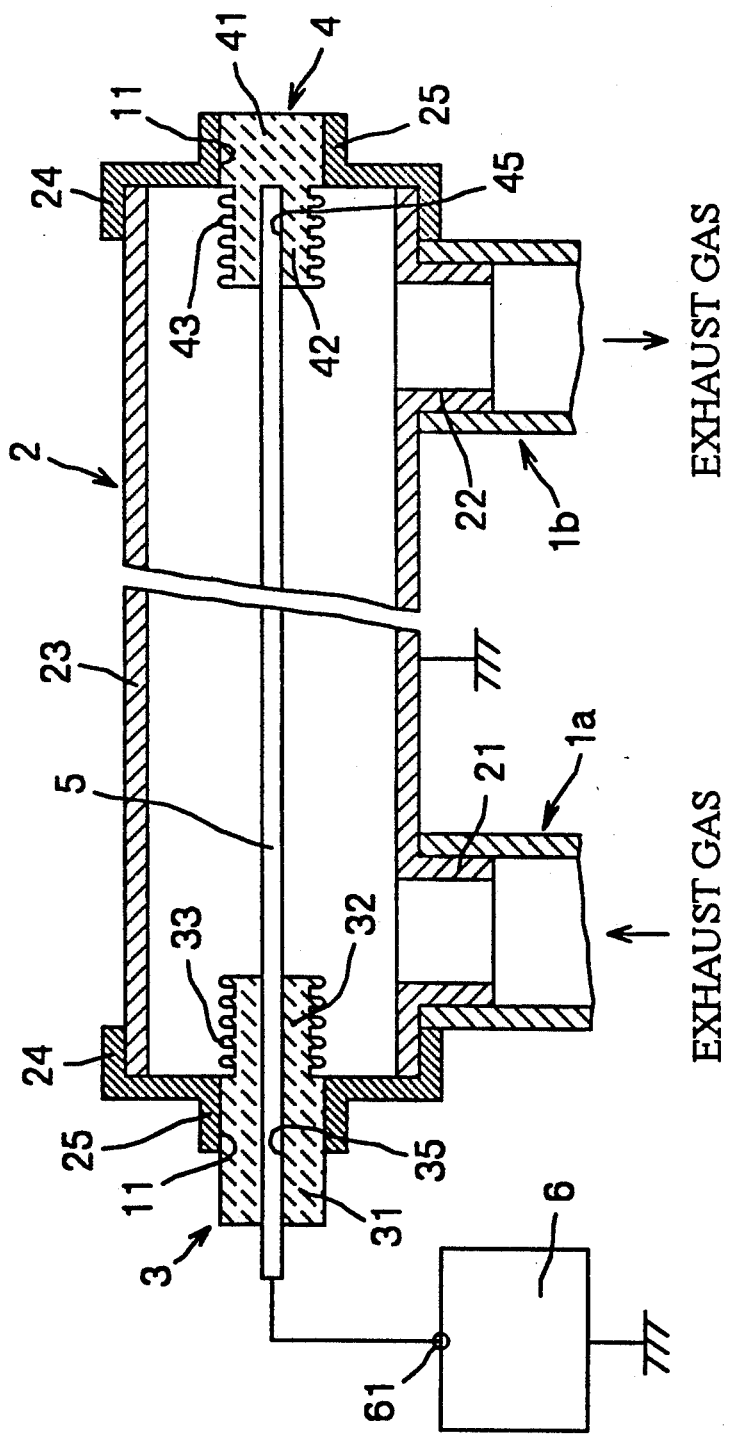
FIG. 1 is a cross sectional view of an exhaust gas purifying apparatus of a First Preferred Embodiment according to the present invention.

FIG. 1 illustrates a First Preferred Embodiment of an exhaust gas purifying apparatus according to the present invention. The apparatus comprises an outer container 2 engaging with and connecting an upstream-side exhaust pipe 1a and a downstream-side exhaust pipe 1b of a diesel engine (not shown), insulators 3, 4 disposed in central holes 11, 11 opened at both ends of the outer container 2, a high voltage electrode 5 made from stainless steel and held by the insulators 3, 4 at the both ends and extending in an axial direction of the outer container 2, and a high voltage power source 6 including an output terminal 61 connected to the high voltage electrode 5.

The outer container 2 is made from stainless steel and has a cylindrical shape. The outer container 2 includes a main cylinder 23 including a cylindrical inlet port 21 and a cylindrical outlet port 22 and opened at both ends, the inlet and outlet ports 21, 22 protruding from an outer peripheral surface thereof, and covers 24, 24 detachably engaging with and sealing the openings of the main cylinder 23 at the both ends. The cylindrical inlet port 21 and the cylindrical outlet port 22 are disposed adjacent to the both ends of the outer container 2 and protruded in the same direction. The cylindrical inlet port 21 and the cylindrical outlet port 22 are respectively disposed into the upstream-side exhaust pipe 1a and the downstream-side exhaust pipe 1b, and are connected to the pipes 1a and 1b so as to make an exhaust gas flowable. At a central portion of the covers 24, 24, a cylindrical wall 25 is protruded outward in an axial direction.

The insulators 3, 4 are made from alumina porcelain, and include cylindrical engagers 31, 41 disposed detachably in the cylindrical walls 25, 25 of the covers 24, 24, and inner protruders 32, 42 formed integrally with the engagers 31, 41 and extending into the main cylinder 23 in an axial direction. On outer peripheral surfaces of the inner protruders 32, 42, a plurality of ribs 33, 43 are disposed in a corrugated manner so as to inhibit a creeping discharge. Holes 35, 45 are formed in an axial direction at a central portion of the insulators 3, 4, and the rod-shaped high voltage electrode 5 are disposed and fixed therein. One end of the high voltage electrode 5 is pierced through the insulator 3, and another end thereof is buried in the insulator 4.

The high voltage power source 6 applies a negative DC high voltage to the high voltage electrode 5 connected to the output terminal 61, and generates a corona discharge between the high voltage electrode 5 and the outer container 2 grounded via a vehicle body (not shown). Since an arrangement of a circuit of a high voltage power source 6 is well known, it will not be described herein.

The exhaust gas purifying apparatus thus constructed operates as follows. An exhaust gas emitted from a diesel engine is supplied into the outer container 2 via the upstream-side exhaust pipe 1a, and discharged to the outside via the downstream-side exhaust pipe 1b and a muffler (not shown).

The high voltage power source 6 applies a negative DC high voltage to the high voltage electrode 5, thereby generating a corona discharge between the high voltage electrode 5 and the outer container 2. With the corona discharge, diesel particulates in the exhaust gas are charged negatively, attracted by an electric field formed between the high voltage electrode 5 and the outer container 2, and deposit on an inner surface of the outer container 2. Thus, a clean exhaust gas is discharged through the downstream-side exhaust pipe 1b.

The diesel particulates depositing in the outer container 2 can be cleaned periodically. When cleaning, the outer container 2 is pulled upward in FIG. 1 so as to separate it from the upstream-side exhaust pipe 1a and downstream-side exhaust pipe 1b. Then, the covers 24, 24 are removed from the main cylinder 23 and the insulators 3, 4. Thus, the diesel particulates depositing in the outer container 2 can be removed therefrom.

An evaluation test was carried out to the exhaust gas purifying apparatus. The exhaust gas apparatus was so designed that the inner surface of the outer container 2 had 66 mm in diameter, the high voltage electrode 5 had 0.5 mm in diameter and 1000 mm in effective axial length. Results of the evaluation test are illustrated in FIG. 2.

Figure 2:
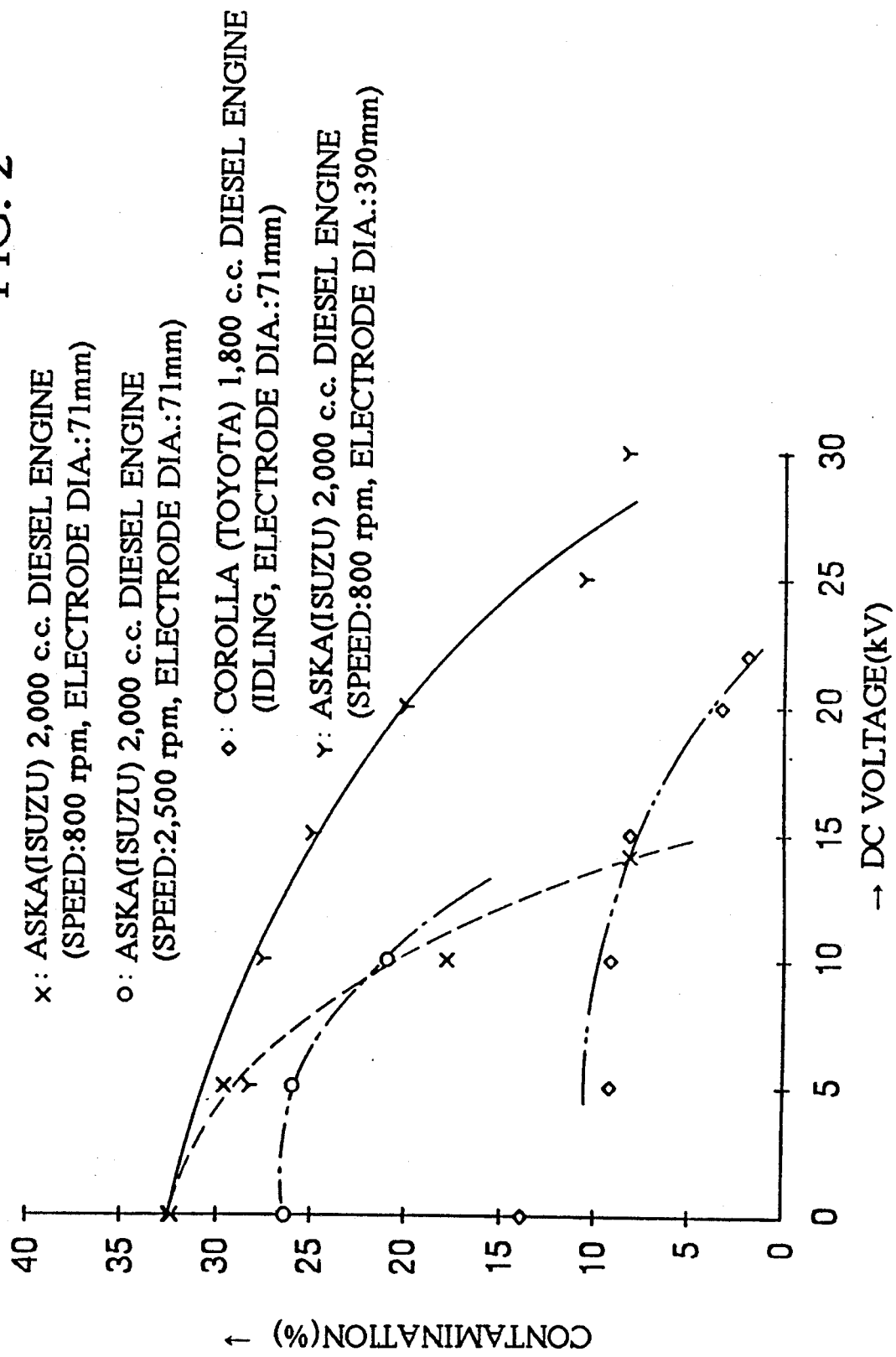
FIG. 2 shows characteristic curves illustrating relationships between contaminations and applied voltages, and explains results of evaluation on the exhaust gas purifying apparatus of the First Preferred Embodiment.

As can be seen from FIG. 2, the contaminations decreased sharply as the DC voltage increased. Here, the contamination was a degree how a filter paper for measuring an exhaust smoke concentration was contaminated, and the filter paper was the one conforming to "JIS (Japanese Industrial Standard) D 1101." The contamination was expressed by the following formula:

$$\text{Contamination (\%)} = 100 - 1.15 \times (\text{Radiance})$$

Figure 5:
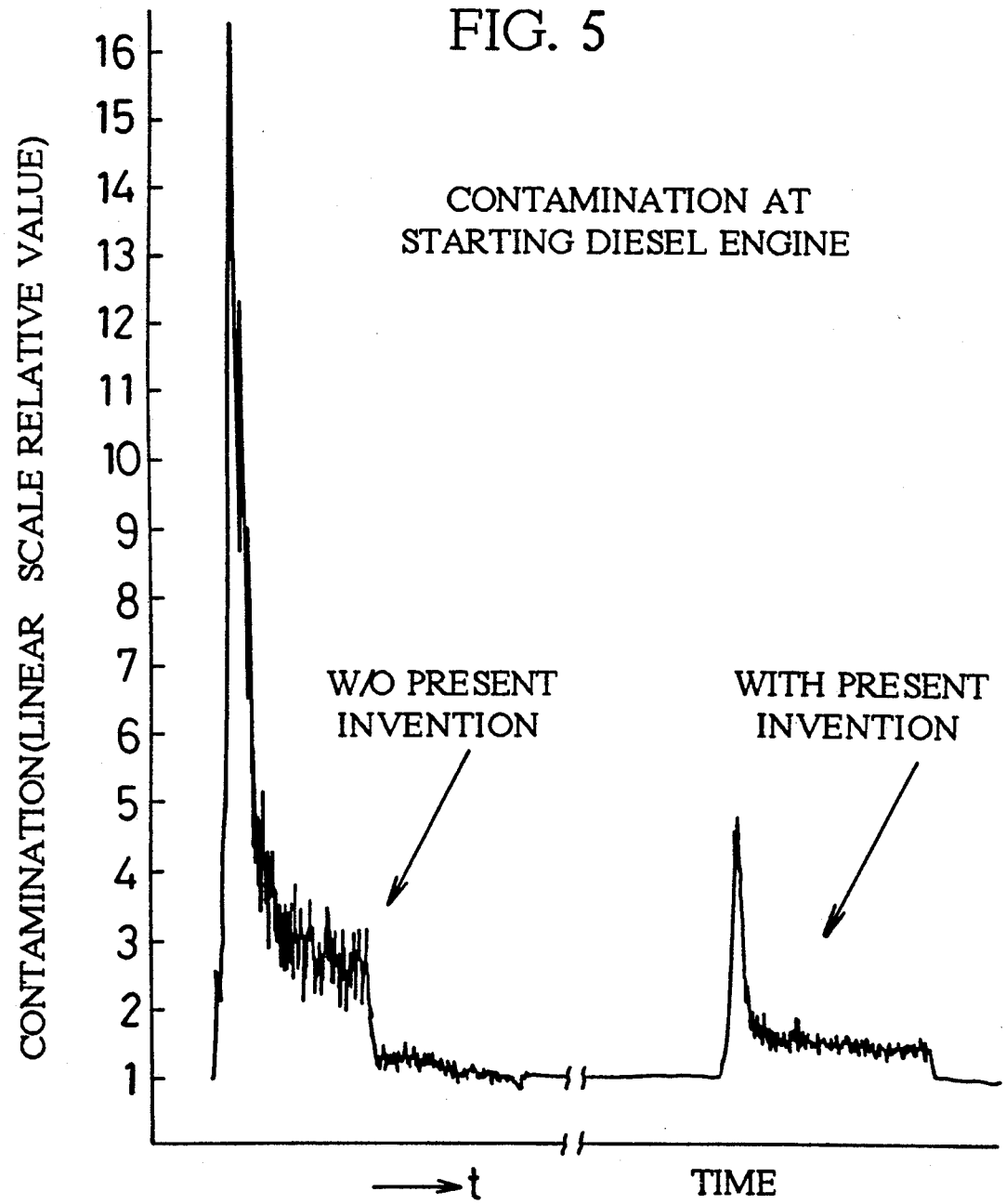
FIG. 5 is a diagram illustrating contamination reduction effect at the time of starting a diesel engine.

Further, the contaminations at the time of starting a diesel engine are illustrated in FIG. 5. It is apparent from FIG. 5 that the contamination was improved remarkably by the exhaust gas purifying apparatus of the First Preferred Embodiment at the time of starting a diesel engine.

Figure 6:
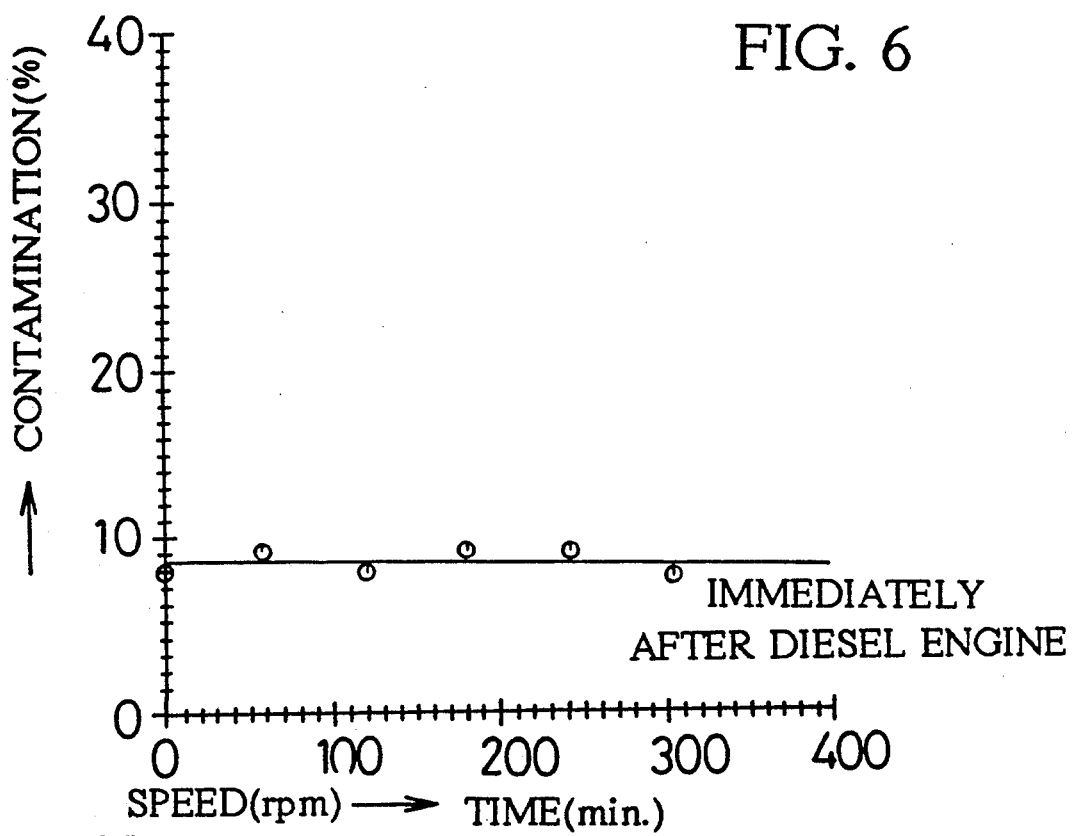
FIG. 6 is a diagram illustrating how contamination depends on time at an outlet of a diesel engine.
Figure 7:
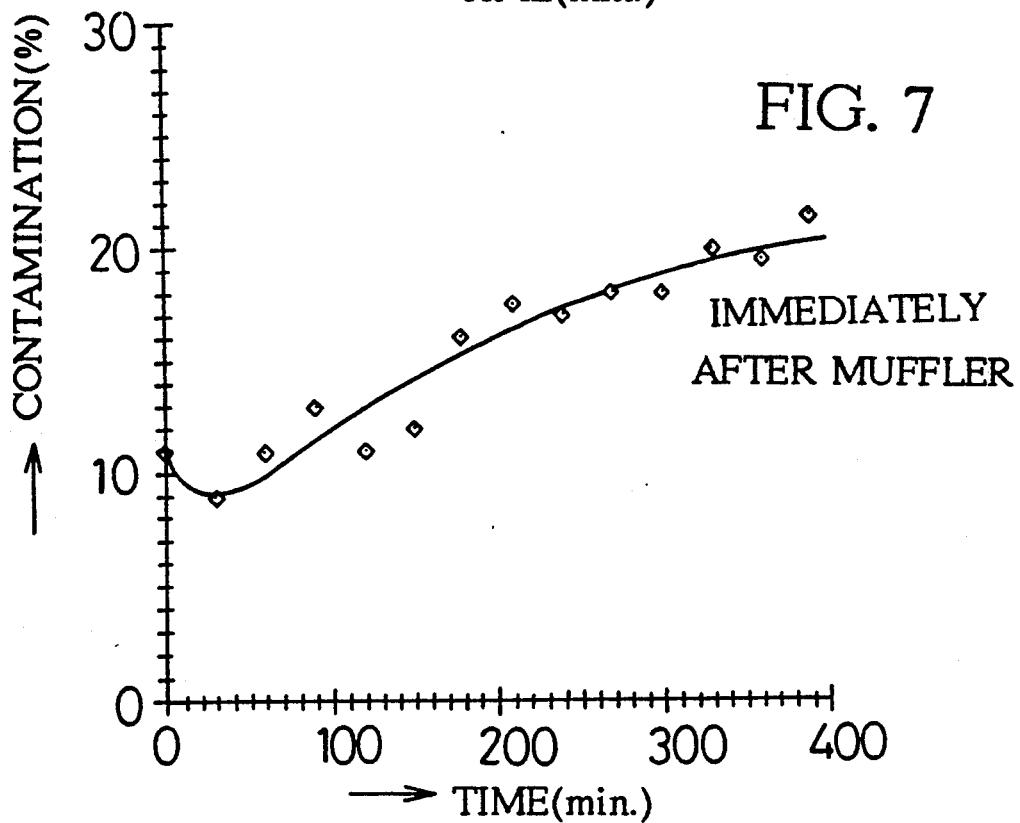
FIG. 7 is a diagram illustrating how contamination depends on time at an outlet of an exhaust pipe.

Furthermore, the exhaust gas purifying apparatus of the First Preferred Embodiment was disposed at an outlet port of a diesel engine (i.e., at an upstream-side of an exhaust pipe), and the contaminations were measured. Also, the exhaust gas purifying apparatus was disposed at an outlet port of an exhaust pipe, and the contaminations were measured. The results are set forth in FIGS. 6 and 7 respectively. As shown in FIG. 6, in the case that the exhaust gas purifying apparatus was disposed at an upstream-side of an exhaust pipe, the contaminations were reduced remarkably when compared with the contamination of a diesel engine without the exhaust gas purifying apparatus (taken as 1). It is believed as follows. Since the diesel particulates are charged heavily in negative immediately after they come out of a diesel engine (namely, immediately after they undergo the combustion reaction in cylinders of the diesel engine), and since they are ionized highly due to their high temperatures, their collecting efficiency can be improved.

A modified version of the First Preferred Embodiment will be hereinafter described. In the modified version, the high voltage power source applies a voltage not causing a corona discharge is applied to the high voltage electrode 5. As a result, no corona discharge is generated between the high voltage electrode 5 and the outer container 2. However, since the diesel particulates discharged from a diesel engine are charged heavily in negative because of the combustion reaction in the cylinders (not shown) of the diesel engine, they are accelerated electrostatically between the high voltage electrode 5 and the outer container 2. Thus, they are urged to the outer container 2 and collected by the outer container 2.

Second Preferred Embodiment

Figure 3:
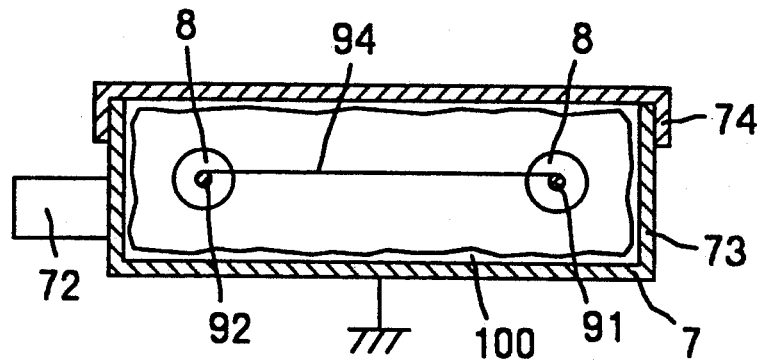
FIG. 3 is a cross sectional view of an exhaust gas purifying apparatus of a Second Preferred Embodiment according to the present invention, and is viewed in the direction of the arrows "A—A" in FIG. 4.

An exhaust gas purifying apparatus of a Second Preferred Embodiment of the present invention will be hereinafter described with reference to FIGS. 3 and 4. The apparatus comprises an outer container 7 engaging with and connecting an upstream-side exhaust pipe 1c and a downstream-side exhaust pipe 1d of a diesel engine (not shown), insulators 8, 81 fixed on inner surfaces of the outer container 7, a high voltage electrode 9 held by the insulators 8, 81, and a high voltage power source 6 connected to the high voltage electrode 9 via an output terminal 60.

The outer container 7 is made from stainless steel and has a squared-box shape. The outer container 7 includes a box 73 opened at the top and including a cylindrical inlet port 71 and a cylindrical outlet port 72, and a cover 74 detachably engaging with and sealing the inner space of the box 73. The cylindrical inlet port 71 and the cylindrical outlet port 72 are respectively disposed into the upstream-side exhaust pipe 1c and the downstream-side exhaust pipe 1d detachably, and are connected to the pipes 1c and 1d so as to make an exhaust gas flowable.

The insulators 8, 81 support the high voltage electrode 9 in an electrically insulatable manner in the outer container 7. Namely, two pairs of the insulators 8, 8 support both ends of stainless steel rods 91, 92, respectively, and the insulator 81 supports a stainless steel rod 93 extending perpendicularly to the stainless steel rods 91, 92. The stainless steel rod 93 penetrates through the insulator 81, and are connected to the high voltage power source 6 via a conductor cylinder 63 of a connector terminal 60. Further, the stainless steel rod 93 is welded to the stainless steel rods 91, 92, and the stainless steel rods 91, 92, 93 are welded to a stainless steel wire net 94. The stainless steel rods 91, 92, 93 and the stainless steel wire net 94 are disposed parallel to the cover 74, and apply a negative DC high voltage to the high voltage electrode 9 so as to cause a corona voltage, thereby depositing a diesel particulates layer 100 on an inside of the outer container 7.

Figure 4:
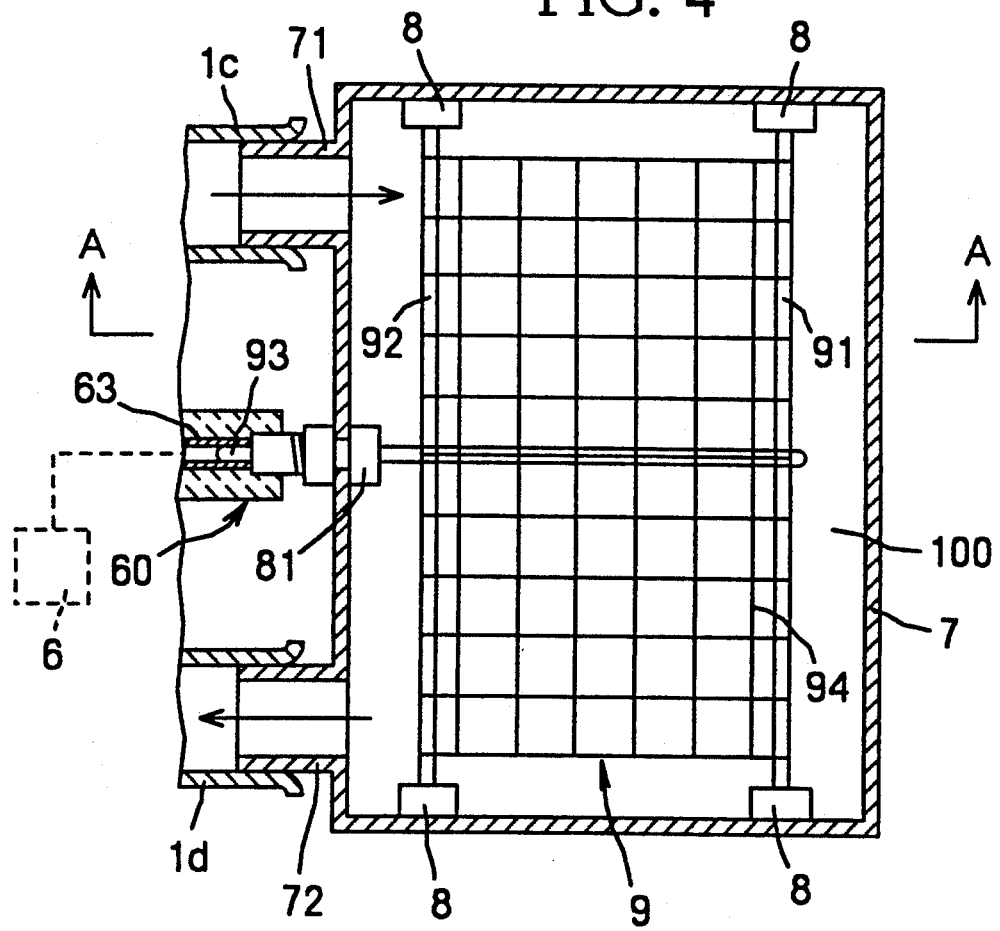
FIG. 4 is a lateral cross sectional view of the exhaust gas purifying apparatus of the Second Preferred Embodiment.

Also in the apparatus of the Second Preferred Embodiment, when cleaning the diesel particulates layer 100, the outer container 7 is pulled in the right direction in FIG. 4 so as to separate it from the upstream-side exhaust pipe 1c, the downstream-side exhaust pipe 1d and the connector terminal 60. Then, the cover 74 are opened in order to remove the diesel particulates layer 100 from the box 73. Finally, since the apparatus of the Second Preferred Embodiment is formed in a squared-box shape having a shallow depth, it can be installed on a bottom of a vehicle body with ease, and accordingly it enables easy cleaning.

Third Preferred Embodiment

Figure 8:
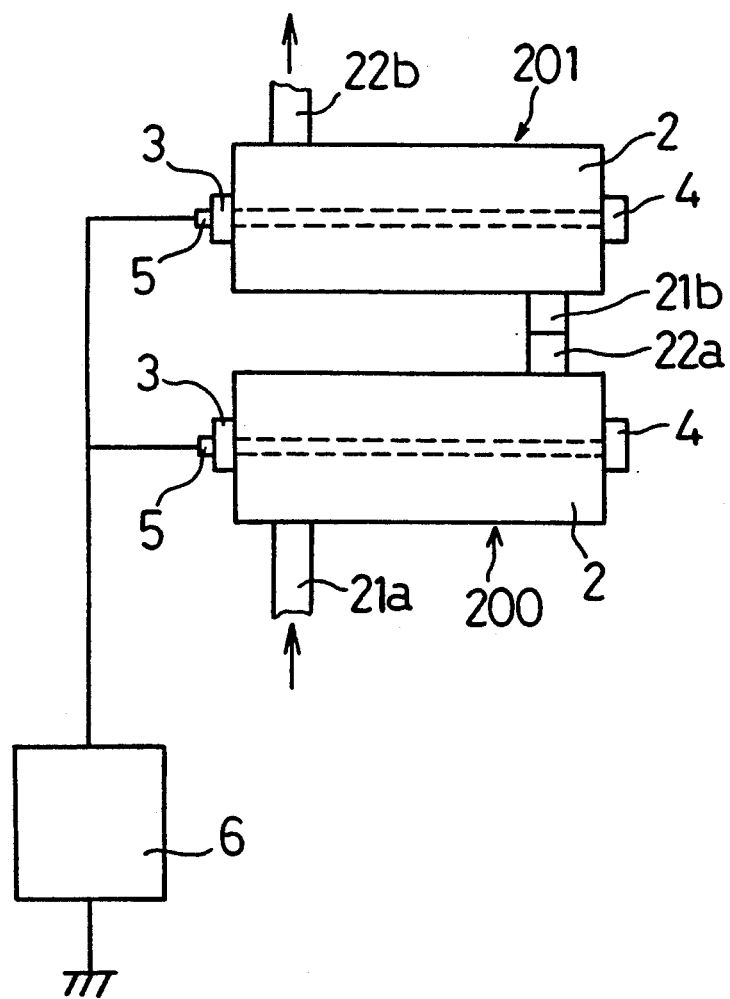
FIG. 8 is a block diagram of an exhaust gas purifying apparatus of a Third Preferred Embodiment according to the present invention.

An exhaust gas purifying apparatus of a Third Preferred Embodiment of the present invention will be hereinafter described with reference to FIG. 8. The apparatus comprises two substantially identical units 200 and 201 disposed into an upstream-side exhaust pipe (not shown) and a downstream-side exhaust pipe (not shown) of a diesel engine (not shown). The units 200 and 201 have functions being identical with those of the exhaust gas apparatus of the First Preferred Embodiment, and comprise an outer cylinder 2, insulators 3, 4 fixed on an inner surface of the outer container 2 and a high voltage electrode 5 held by the insulators 3, 4, respectively. The high voltage electrodes 5 are connected to a high voltage power source 6.

A cylindrical inlet port 21a of the unit 200 engages with the upstream-side exhaust pipe of the diesel engine, and the cylindrical outlet port 22a of the unit 200 engages with a cylindrical inlet port 21b of the unit 201, and a cylindrical outlet port 22b of the unit 201 engages with the downstream-side exhaust pipe of the diesel engine.

Further, an inner diameter of the outer container 2 of the unit 200 is designed to be greater than an inner diameter of the outer container 2 of the unit 201. Accordingly, when an identical voltage is applied to the units 200 and 201, no corona discharge occurs in the unit 200, but a corona discharge occurs only in the unit 201.

With the apparatus, the diesel particulates charged in negative by the combustion reaction in the cylinders (not shown) of the diesel engine are first collected by the unit 200. Then, rest of the diesel particulates are further charged in negative by the corona discharge in the unit 201, and collected by the unit 201. Of course, it is possible to integrate the units 200 and 201 of the Third Preferred Embodiment.

Fourth Preferred Embodiment

Figure 9:
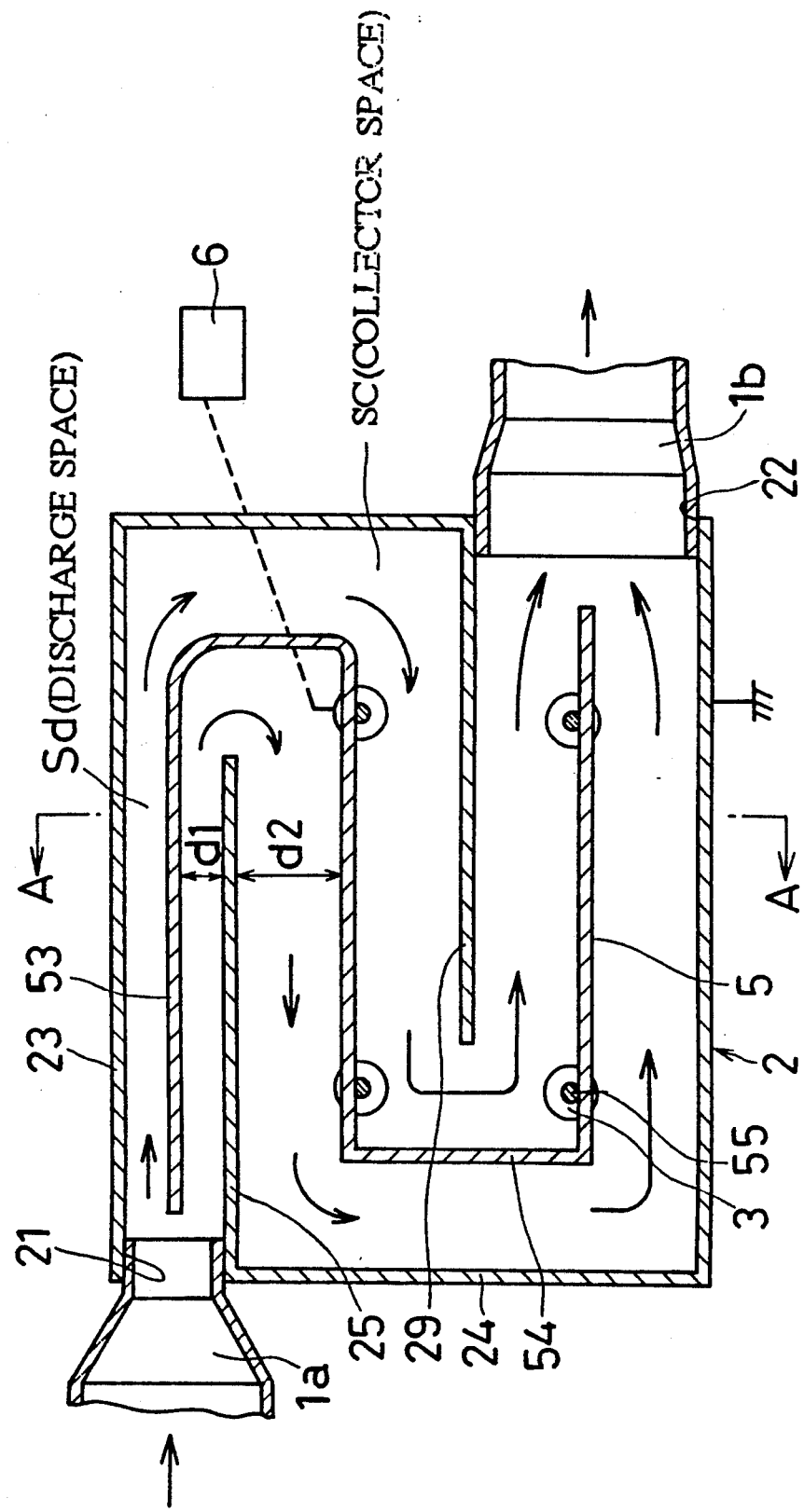
FIG. 9 is a lateral cross sectional view of an exhaust gas purifying apparatus of a Fourth Preferred Embodiment according to the present invention.
Figure 10:
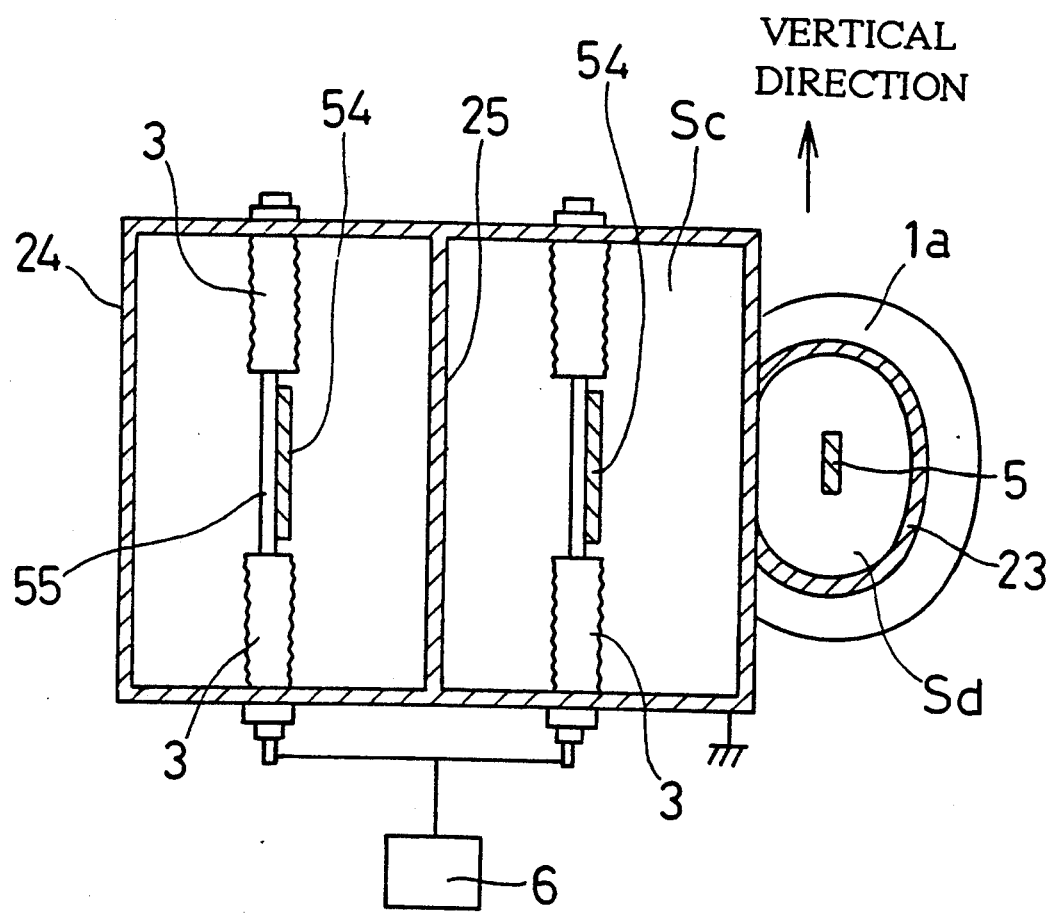
FIG. 10 is a cross sectional view of the exhaust gas purifying apparatus of the Fourth Preferred Embodiment, and is viewed in the direction of the arrows "A—A" in FIG. 9.

FIGS. 9 and 10 illustrate cross sectional views of a Fourth Preferred Embodiment of an exhaust gas purifying apparatus according to the present invention. The apparatus comprises an outer container 2 engaging with and connecting an upstream-side exhaust pipe 1a and a downstream-side exhaust pipe 1b of a vehicle diesel engine, a high voltage electrode 5 made from stainless steel and held by insulators 3 in the outer container 2, and a high voltage power source 6 connected to the high voltage electrode 5.

The outer container 2 is made from stainless steel and has an enclosed box shape. An inlet hole 21 and an outlet hole 22 are formed in the side walls of the outer container 2 respectively, and engage with the upstream-side exhaust pipe 1a and the downstream-side exhaust pipe 1b independently. In the outer container 2, an exhaust gas flow path is defined by partition walls 25, 29 in a numeral "2" shape. A first linear portion of the path forms a discharge space Sd, and the following path forms a collector space Sc (i.e., the space between the pair of collector electrodes). Namely, a portion 23 of the outer container 2 enclosing the discharge space Sd and a surface of the partition wall 25 form one of the pair of discharge electrodes, and a portion 53 of the high voltage electrode 5 disposed in the discharge space Sd forms another one of the pair of discharge electrodes. Further, a portion 24 of the outer container 2 enclosing the collector space Sc, another surface of the partition wall 25 and the partition wall 29 form one of the pair of collector electrodes, and a portion 54 of the high voltage electrode 5 disposed in the collector space Sc forms another one of the pair of collector electrodes. As illustrated in FIG. 10, the portion 23 (hereinafter referred to as a "discharge electrode unit") of the outer container 2, made to work as the one of the pair of discharge electrodes, is formed in a pipe shape having a small diameter and a long length, and the portion 24 (hereinafter referred to as a "collector electrode unit") of the outer container 2, made to work as the one of the pair of collector electrodes, is formed in a squared box shape.

The high voltage electrode 5 is formed in a plate shape having a small width and a long length at the discharge electrode side 53, and it is formed in a plate shape having a large width and a long length at the collector electrode side 54. The thickness-wise direction of the high voltage electrode 5 is disposed parallel to the vertical direction of the apparatus.

As illustrated in FIG. 10, supporting rods 55 extend in the vertical direction, and are welded to the collector electrode sides 54 of the high voltage electrode 5. The top and bottom ends of the supporting rods 55 are held on the outer container 2 via the insulators 3 made from alumina porcelain in an electrically insulatable manner. Further, the insulators 3 are disposed in holes (not shown) of the outer container 2 in a piercing manner, and the supporting rods 55 are fixed to the insulators 3 in a piercing manner. The supporting rods 55 work as an electricity supplying member, and are connected to the high voltage power source 6. The high voltage power source 6 applies a negative DC high voltage to the high voltage electrode 5, and generates a corona discharge between the high voltage electrode 5 and the outer container 2 grounded via a vehicle body (not shown). Since an arrangement of a circuit of the high voltage power source 6 is well known, it will not be described herein.

The exhaust gas purifying apparatus thus constructed operates as follows. An exhaust gas emitted from a vehicle diesel engine is supplied into the outer container 2 via the upstream-side exhaust pipe 1a, and discharged to the outside via the downstream-side exhaust pipe 1b and a muffler (not shown).

The high voltage power source 6 applies a negative DC high voltage to the high voltage electrode 5, thereby generating a corona discharge between the high voltage electrode 5 and the outer container 2 in the discharge space Sd having a smaller interval d1 (See FIG. 9.). With the corona discharge, diesel particulates in the exhaust gas are charged negatively in the discharge space Sd. Since the collector space Sc has a larger interval d2, no corona discharge is generated in the collector space Sc. but only an electric field is generated therein. Accordingly, the diesel particulates flowing into the collector space Sc are attracted by the electric field, and deposit on an inner surface of the outer container 2. Thus, a clean exhaust gas is discharged through the downstream-side exhaust pipe 1b.

The diesel particulates depositing in the outer container 2 are burned up by a diesel particulates burning member (not shown) periodically. In addition, in the apparatus of the Fourth Preferred Embodiment, since no insulators 3 are disposed in the discharge space Sd in which the strong electric field is generated, this construction is advantageous for reducing the leakage current.

Fifth Preferred Embodiment

Figure 11:
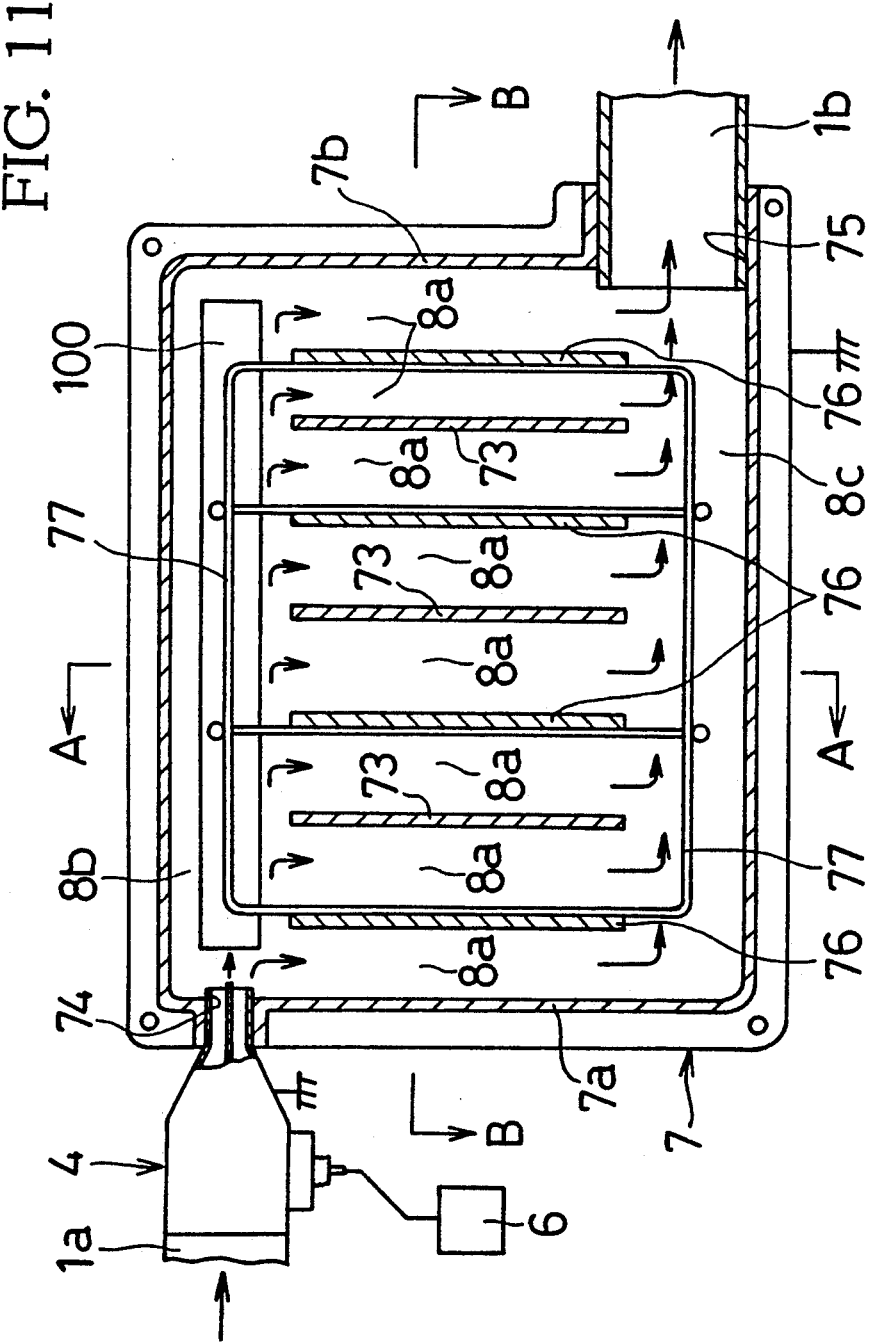
FIG. 11 is a lateral cross sectional view of an exhaust gas purifying apparatus of a Fifth Preferred Embodiment according to the present invention.
Figure 12:
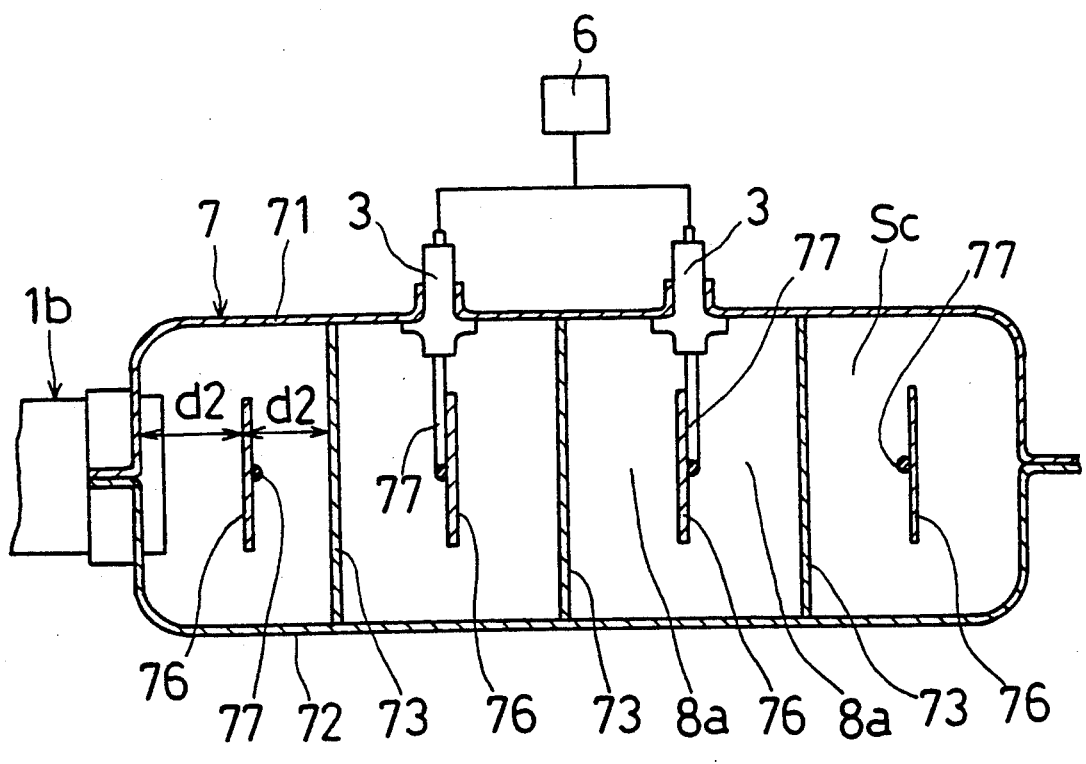
FIG. 12 is a cross sectional view of the exhaust gas purifying apparatus of the Fifth Preferred Embodiment, and is viewed in the direction of the arrows "B—B" in FIG. 11.
Figure 13:
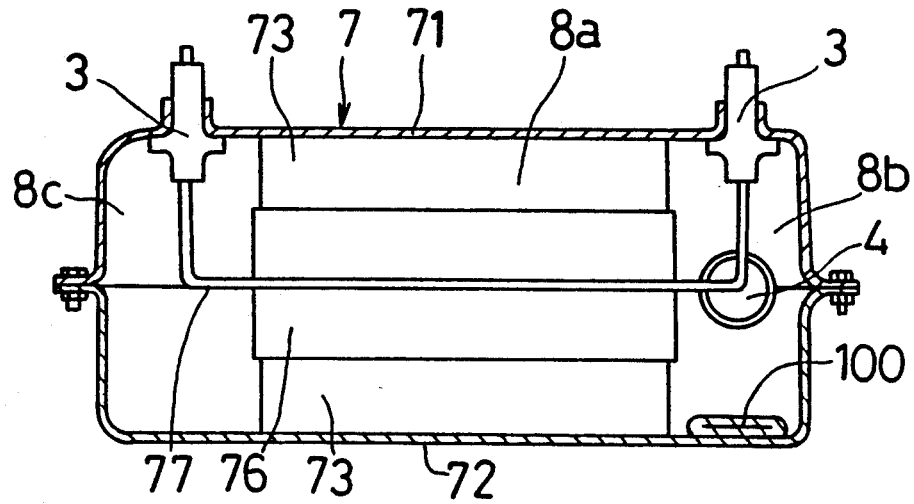
FIG. 13 is a cross sectional view of the exhaust gas purifying apparatus of the Fifth Preferred Embodiment, and is viewed in the direction of the arrows "A—A" in FIG. 11.
Figure 14:
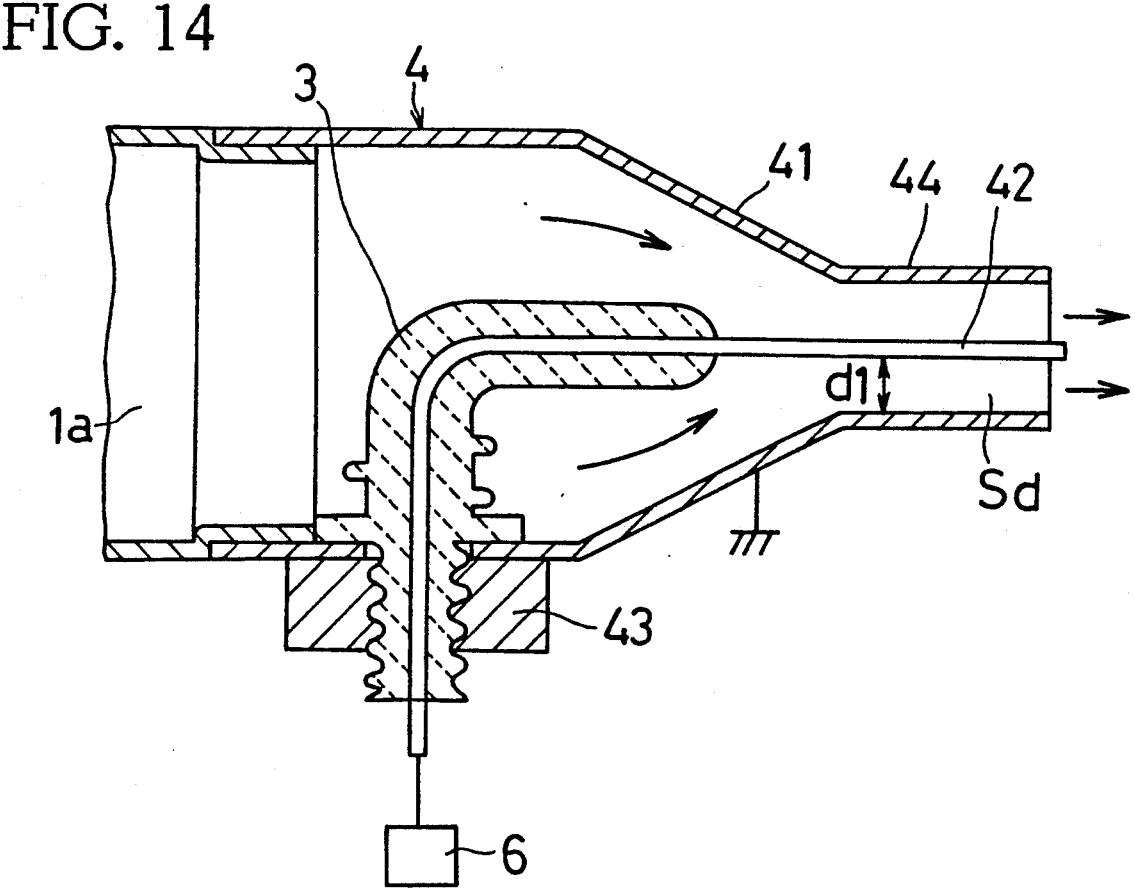
FIG. 14 is a cross sectional view of a nozzle portion of the exhaust gas purifying apparatus of the Fifth Preferred Embodiment.

FIGS. 11 through 14 illustrate a Fifth Preferred Embodiment of the exhaust gas purifying apparatus according to the present invention. FIG. 11 is a lateral cross sectional view thereof, FIG. 12 is a cross sectional view thereof viewed in the direction of the arrows "B—B" in FIG. 11, FIG. 13 is a cross sectional view thereof viewed in the direction of the arrows "A—A" in FIG. 11, and FIG. 14 is a cross sectional view a nozzle portion thereof. The apparatus comprises a nozzle portion 4 installed to an upstream-side exhaust pipe 1a of a diesel engine (not shown) and constituting the pair of discharge electrodes, an outer container 7 disposed between the nozzle portion 4 and a downstream-side exhaust pipe 1b and constituting the pair of collector electrodes, and a high voltage power source 6 applying a DC high voltage to the nozzle portion 4 and the outer container 7.

As illustrated in FIG. 14, the nozzle portion 4 includes a cylinder-shaped cone 41 (one of the pair of discharge electrodes) reducing its diameter toward an end, and an electrode rod 42 (another one the pair of discharge electrodes) extending in an axial direction of the cone 41 and held by an insulator 3. Further, the insulator 3 is disposed piercedly in a hole formed in a larger diameter portion of the cone 41, and fixed in the cone 41 by a nut 43a. Furthermore, the insulator 3 is bent in a letter "L" shape toward the front end of the nozzle portion 4, and a base of the electrode rod 42 is disposed piercedly therein. An exposed end of the electrode rod 42 is connected to the high voltage power source 6.

As illustrated in FIGS. 13, the outer container 7 (one of the pair of collector electrode) is an enclosed container having a shallow depth, and includes a cover 71 and a bottom 72. Further, as illustrated in FIG. 11, a hole 74 is formed in a left side wall 7a of the outer container 7 at an end, and the front end of the nozzle portion 4 is disposed in the hole 74. Furthermore, a hole 75 is formed in a right side wall 7b of the outer container 7 at another end, and the downstream-side exhaust pipe 1b is disposed in the hole 75.

As illustrated in FIG. 11, in the inner space (i.e., a collector space Sc) of the outer container 7, a plurality of vertical partition plates 73 is disposed parallel to each other. As also illustrated in FIG. 11, the vertical partition plates 73 form a plurality of exhaust gas flow paths 8a disposed parallel to each other. The flow paths 8a are connected to an upstream-side flow path 8b and a downstream-side flow path 8c, and extend perpendicularly to the upstream-side flow path 8b and the downstream-side flow path 8c. An inlet port of the upstream-side flow path 8b communicates with the nozzle portion 4, and an outlet port of the downstream-side flow path 8c communicates with the downstream-side exhaust pipe 1b.

Further, electrodes 76 (another one of the pair of collector electrodes) are disposed at a central portion of the flow paths 8a parallel to the vertical partition plates 73. As illustrated in FIG. 12, the electrodes 76 are welded to a horizontal frame 77 made of a metallic rod which are held by insulators 3, and disposed in the collector space Sc. Parts of the horizontal frame 77 piercing through the insulators 3 and protruding to the outside are connected to an output terminal of the high voltage power source 6.

The operation of the exhaust gas purifying apparatus thus constructed will be hereinafter described. The nozzle portion 4 throttles and accelerates an in-coming exhaust gas. Since the smaller diameter front end of the cone 41 and the electrode rod 42 disposed therein constitute the pair of discharge electrode, the diesel particulates in the high speed exhaust gas flow are charged when a corona discharge is generated in the discharge space Sd between the cone 41 and the electrode rod 42.

In the Fifth Preferred Embodiment, since the pair of discharge electrodes is made into a nozzle, the discharge space Sd can be down-sized, and the corona discharge can be concentrated therein. Further, since the exhaust gas flows at a high speed, the diesel particulates depositing on the inner surface of the cone 41 and the electrode rod 42 are blown off, and they do not interfere the corona discharge. Furthermore, in the Fifth Preferred Embodiment, the interval d1 of the discharge space Sd can be reduced, and accordingly the discharge voltage can be lowered. Moreover, since the discharge space Sd is small and the exhaust gas flows at a high speed, the NOx generation can be reduced even when a large current is flowed in the discharge space Sd. Since the discharge current is flowed over the entire discharge space Sd at a high density, the diesel particulates can not help being charged. Again, since the exhaust gas flows at a high speed, electrons or ions are very likely to contact with the diesel particulates, and the diesel particulates are accordingly charged quickly. The charged diesel particulates deposit on the inner walls of the outer container 7 and the vertical partition plates 73.

In addition, since the interval d2 of the collector space Sc is larger than the interval d1 of the discharge space Sd, no corona discharge is generated in the collector space Sc when an identical voltage is applied to the collector space Sc and the discharge space Sd. The speed of the exhaust gas is set to a small speed in the collector space Sc, and the traveling time of the diesel particulates is fully secured hereinbefore.

Sixth Preferred Embodiment

Figure 15:
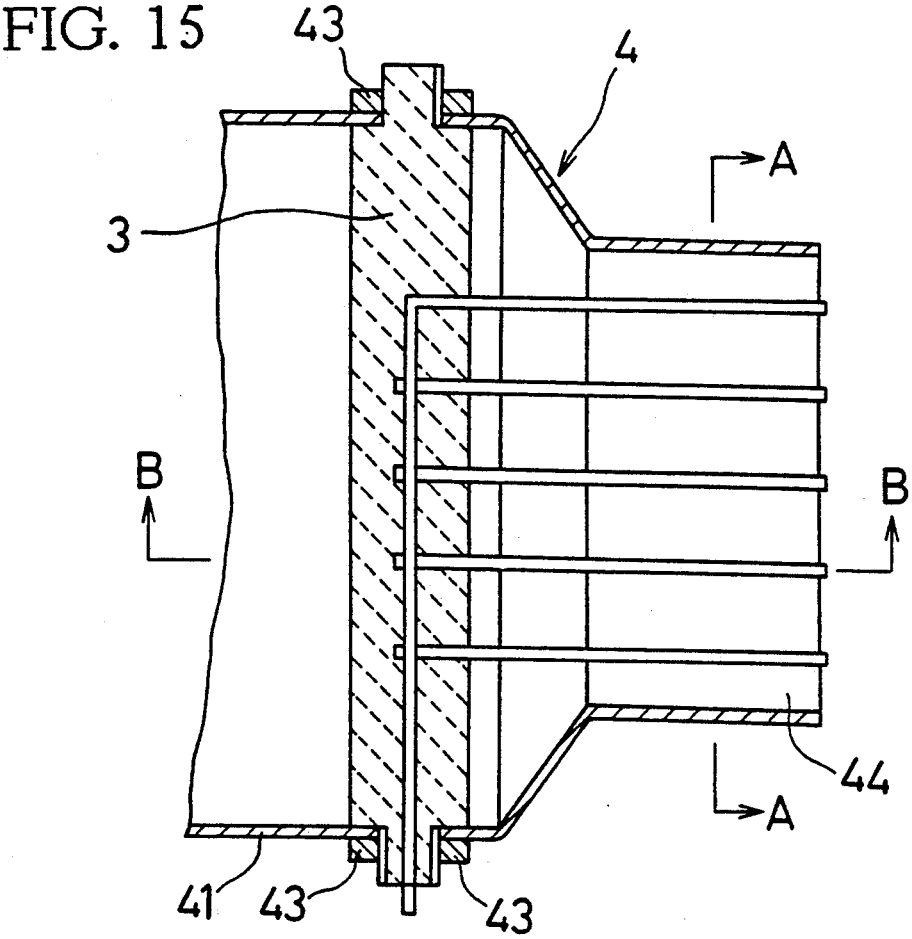
FIG. 15 is a lateral cross sectional view of a nozzle portion of an exhaust gas purifying apparatus of a Sixth Preferred Embodiment according to the present invention.
Figure 16:
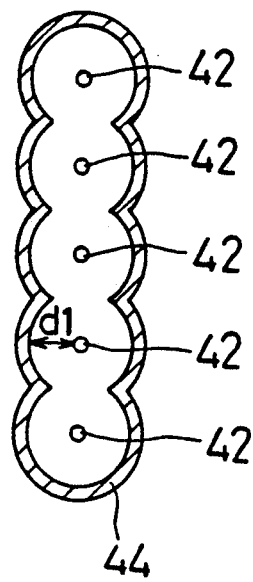
FIG. 16 is a cross sectional view of the nozzle portion of the exhaust gas purifying apparatus, and is viewed in the direction of the arrows "A—A" in FIG. 15.
Figure 17:
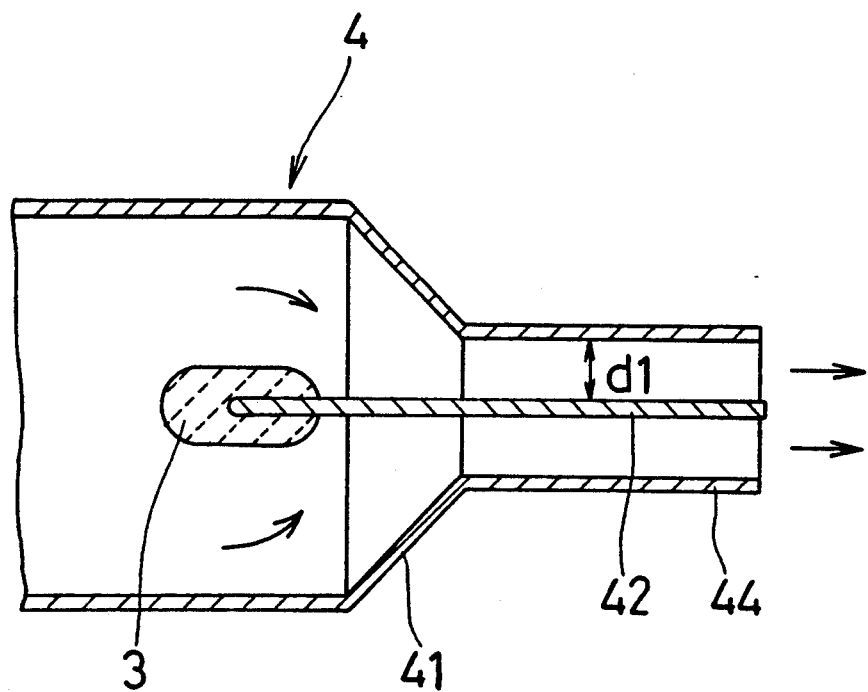
FIG. 17 is a cross sectional view of the nozzle of the exhaust gas purifying apparatus, and is viewed in the direction of the arrows "B—B" in FIG. 15.

FIGS. 15 through 17 illustrate a Sixth Preferred Embodiment of the exhaust gas purifying apparatus according to the present invention. FIG. 15 is a horizontal cross sectional view thereof, FIG. 16 is a cross sectional view thereof viewed in the direction of the arrows "A—A" in FIG. 15, and FIG. 17 is a cross sectional view thereof viewed in the direction of the arrows "B—B" in FIG. 15.

The apparatus includes a modified version of the nozzle portion 4 of the Fifth Preferred Embodiment (illustrated in FIG. 14) which is up-sized without increasing the interval d1 of the discharge space Sd. Namely, both ends of an insulator 3 are fixed on a larger-diameter portion of the cone 41. Further, 5 electrodes 42 are disposed in the front end of the cone 44 having a reducing diameter, and extend from the insulator 3 parallel to each other. Furthermore, the front end 44 of the nozzle portion 4 is designed to have a shape in which circles around the electrodes 42 are connected in series so as to generate a uniform corona discharge. In accordance with the construction, the flow of the exhaust gas can be increased without increasing the diameter of the front end 44 which inevitably requires to increase the discharge voltage.

Seventh Preferred Embodiment

Figure 18:
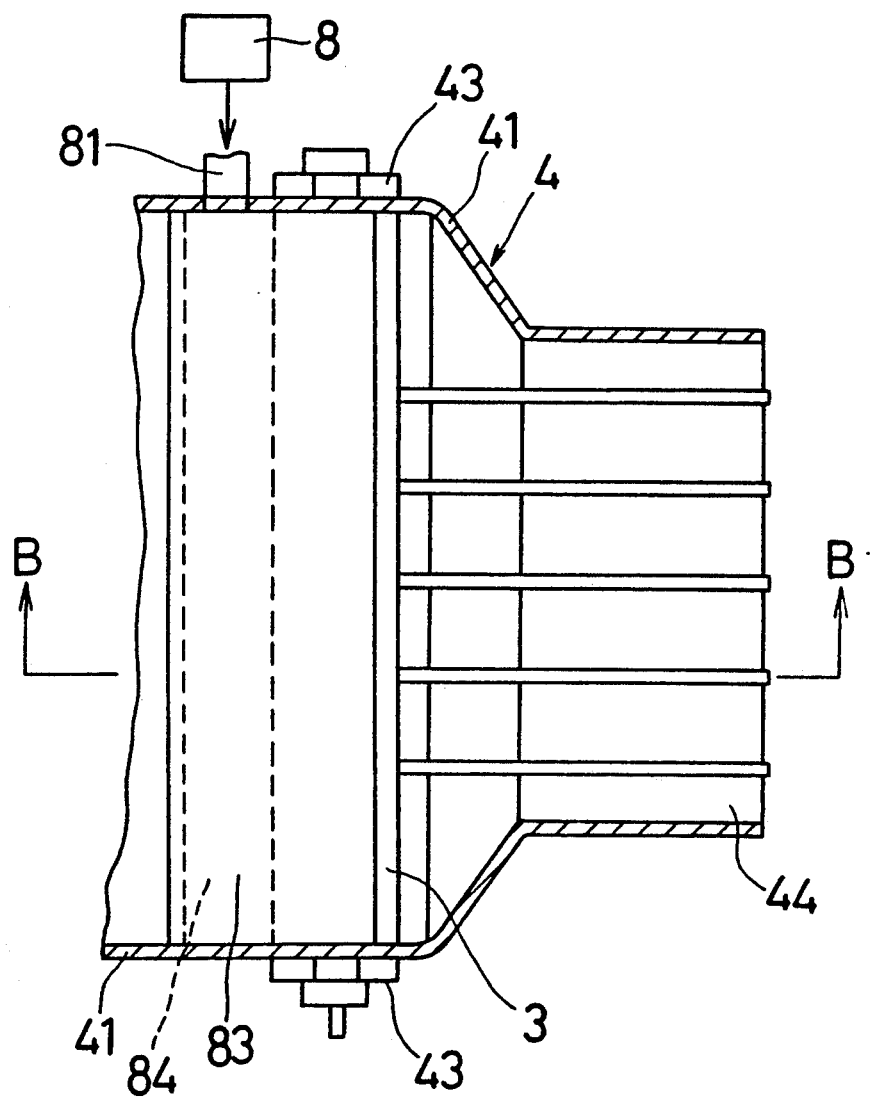
FIG. 18 is a lateral cross sectional view of a nozzle portion of an exhaust gas purifying apparatus of a Seventh Preferred Embodiment according to the present invention.
Figure 19:
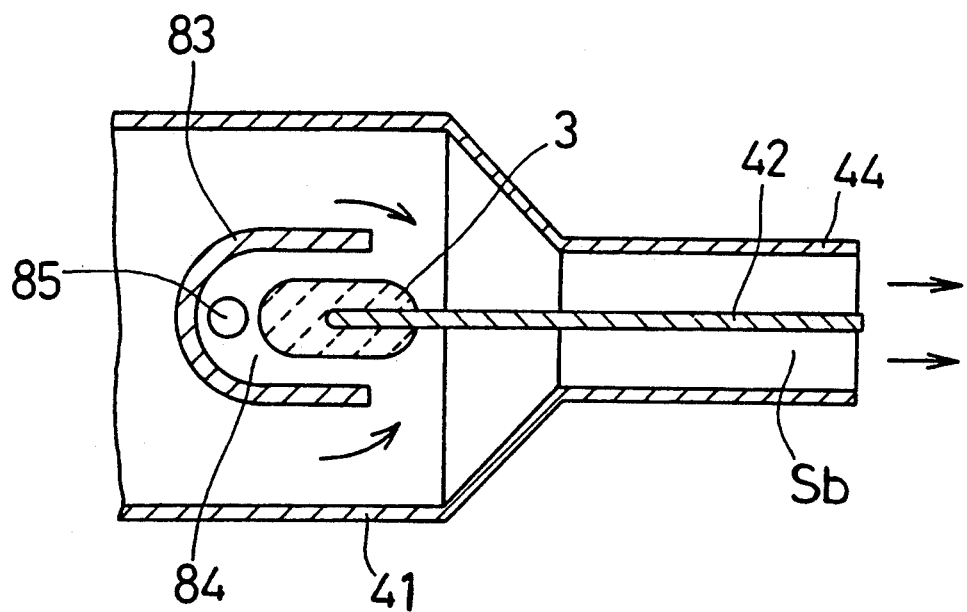
FIG. 19 is a cross sectional view of the nozzle portion of the exhaust gas purifying apparatus, and is viewed in the direction of the arrows "B—B" in FIG. 18.

FIGS. 18 and 19 illustrate a Seventh Preferred Embodiment of the exhaust gas purifying apparatus according to the present invention. FIG. 18 is a lateral cross sectional view thereof, and FIG. 19 is a cross sectional view thereof viewed in the direction of the arrows "B—B" in FIG. 18.

The apparatus includes a modified version of the nozzle portion 4 of the Sixth Preferred Embodiment illustrated in FIGS. 15 through 17. The nozzle portion 4 includes an insulator cover 83 which covers an insulator 3 of the nozzle portion 4, thereby filling up a space 84 between the insulator cover 83 and the insulator 3 with a fresh air.

Namely, as illustrated in FIG. 19, the insulator cover 83 is made from alumina porcelain, and has a letter "U" shape in a lateral cross sectional view. The insulator cover 83 is disposed adjacent to the insulator 3 at a predetermined interval, and covers the outer surfaces of the insulator 3 except the outer surface of the insulator 3 facing the front end of the nozzle portion 4. Further, the both side ends of the insulator cover 83 contact with the inner surfaces of the both side walls of the cone 41. Furthermore, an air inlet hole 85 is opened, and communicates with the space 84 between the insulator cover 83 and the insulator 3. A fresh air is introduced into the space 84 via a pipe 81 and the air inlet hole 85 by a compressor 8. With the construction, the fresh air introduced into the space 84 is flowed in the direction toward the front end of the nozzle portion 4 via intervals between the insulator cover 83 and the insulator 8. Accordingly, it is possible to maintain the electric insulation of the surface of the insulator 3 favorably.

Eighth Preferred Embodiment

Figure 20:
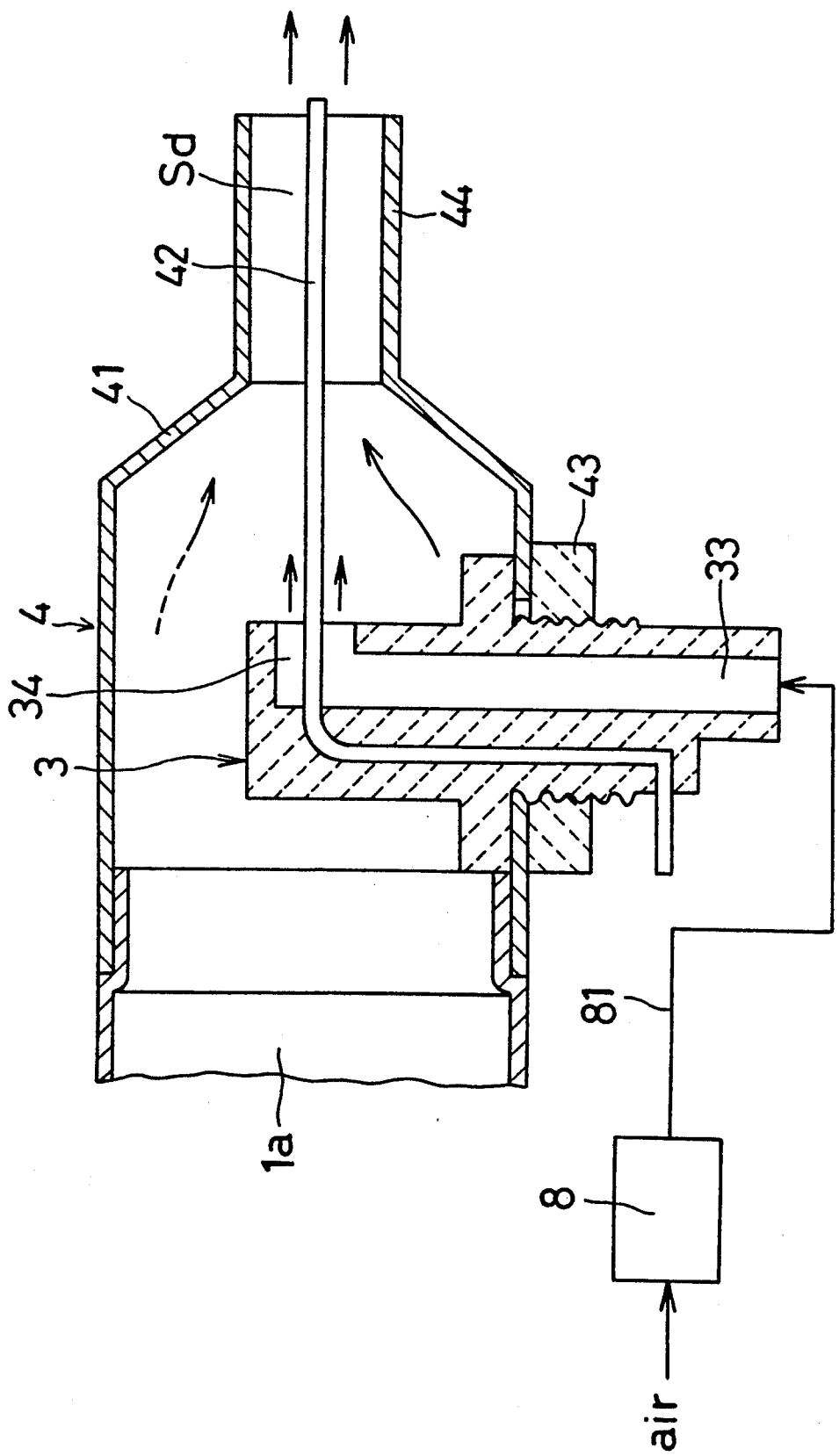
FIG. 20 is a lateral cross sectional view of a nozzle portion of an exhaust gas purifying apparatus of an Eighth Preferred Embodiment according to the present invention.

FIG. 20 illustrates an Eighth Preferred Embodiment of the exhaust gas purifying apparatus according to the present invention. FIG. 20 is a vertical cross sectional view thereof.

The apparatus includes a nozzle portion 4 having a modified construction of the insulator 3 of the Fifth Preferred Embodiment illustrated in FIG. 14. Namely, an insulator 3 of the nozzle portion 4 includes an air supply bore 33 penetrating to a central portion of an insulator 3 in a longitudinal direction thereof (i.e., in the vertical direction in FIG. 20). An inlet of the air supply bore 33 is connected to an outlet port of an air compressor 8 via a pipe 81, and an outlet of the air supply bore 33 is connected to an air blow port 34. The air blow port 34 is disposed at an end of the insulator 3 and extends at a central portion of the nozzle portion 4 in an axial direction toward the front end. The electrode rod 42 extends along the center line of the air blow port 34 toward the front end of the nozzle portion 4.

Accordingly, by blowing a fresh air from the air blow port 34 via the air supply bore 33, it is possible to maintain the electric insulation of the electrode rod 42 even when the outer surface of the insulator 3 is contaminated with the diesel particulates to exhibit deteriorated insulation. In particular, since the insulator 3 itself includes the air supply bore 33 and the air blow port 34, it is unnecessary to provide extra component parts in the nozzle portion 4, and the structure of the nozzle portion 4 can be simplified.

Ninth Preferred Embodiment

Figure 21:
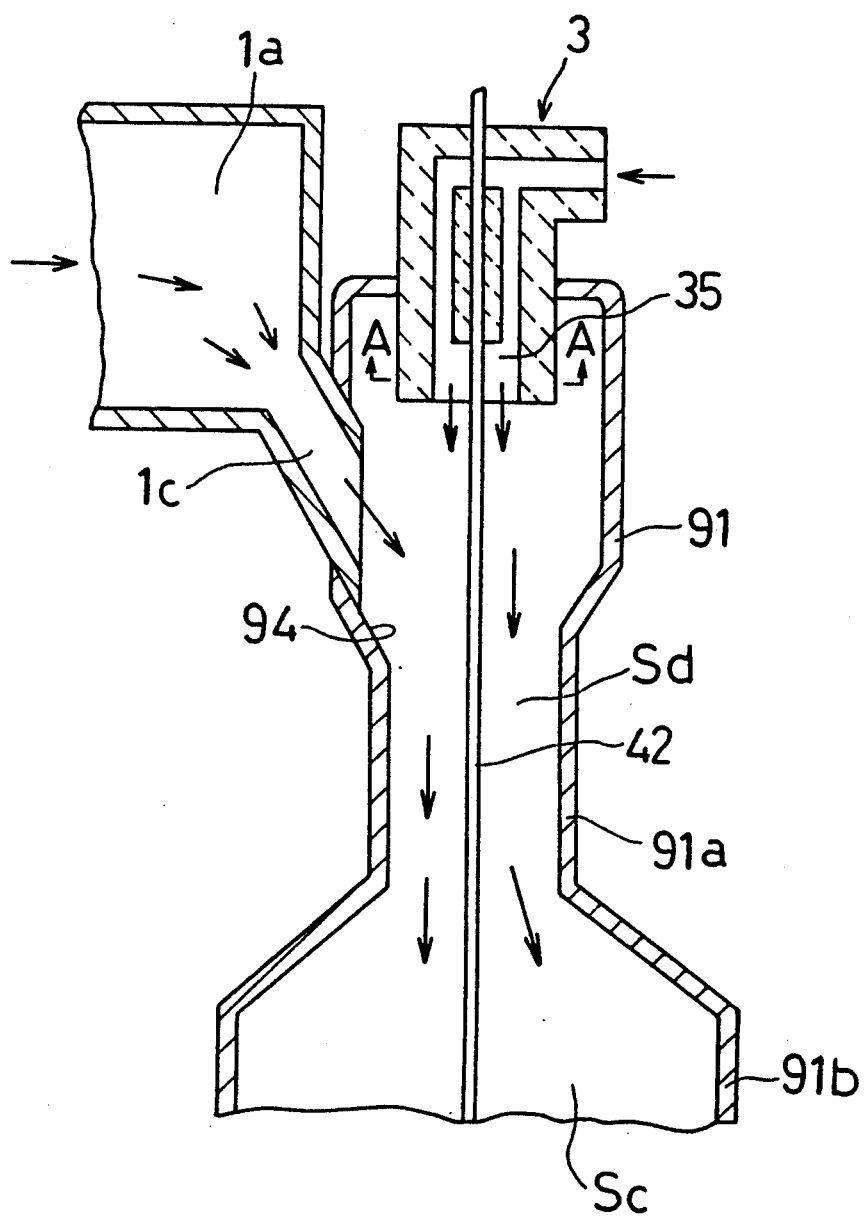
FIG. 21 is a vertical cross sectional view of an upper part of an exhaust gas purifying apparatus of a Ninth Preferred Embodiment according to the present invention.
Figure 22:
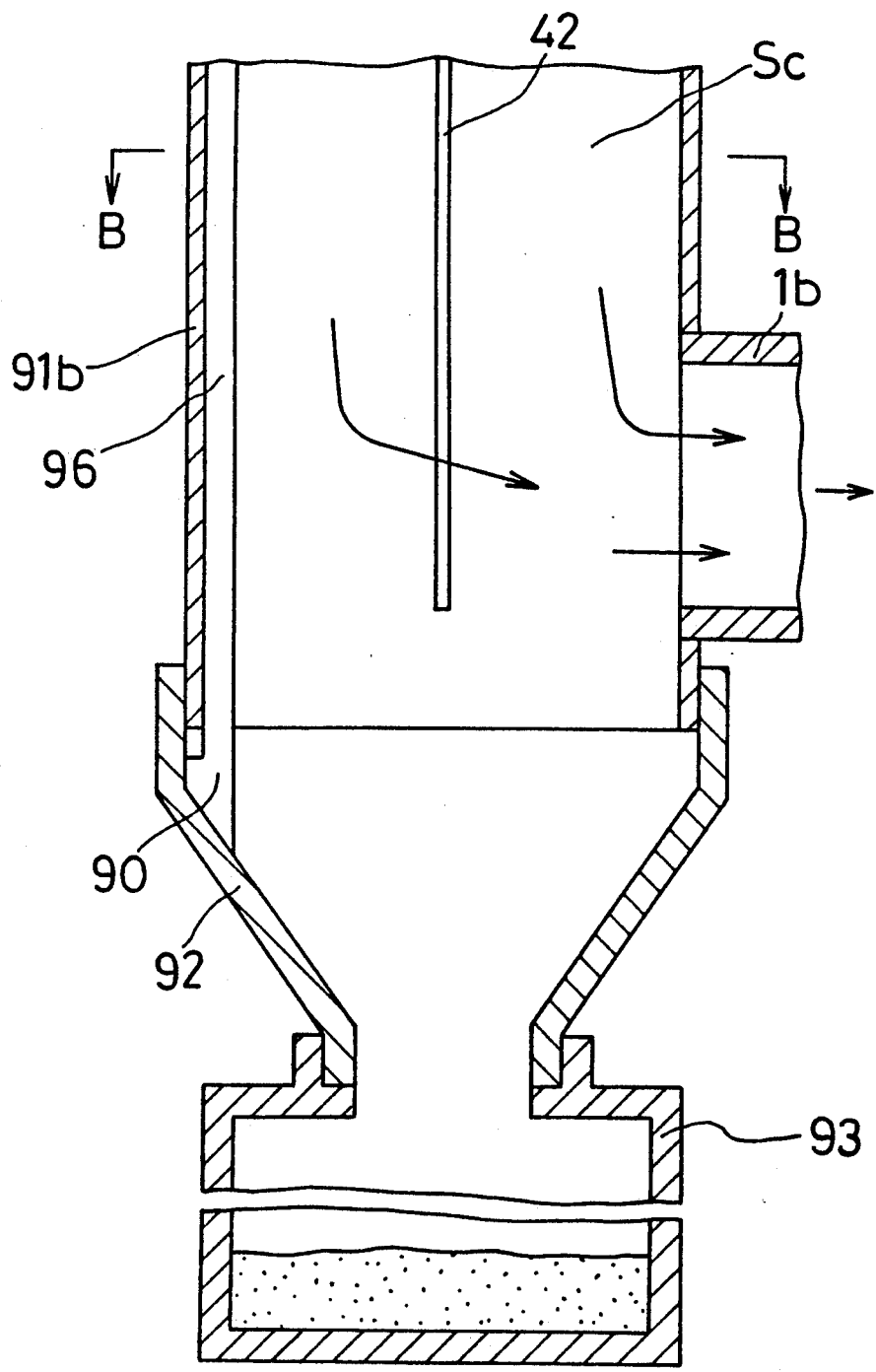
FIG. 22 is a vertical cross sectional view of a lower part of the exhaust gas purifying apparatus of the Ninth Preferred Embodiment.
Figure 23:
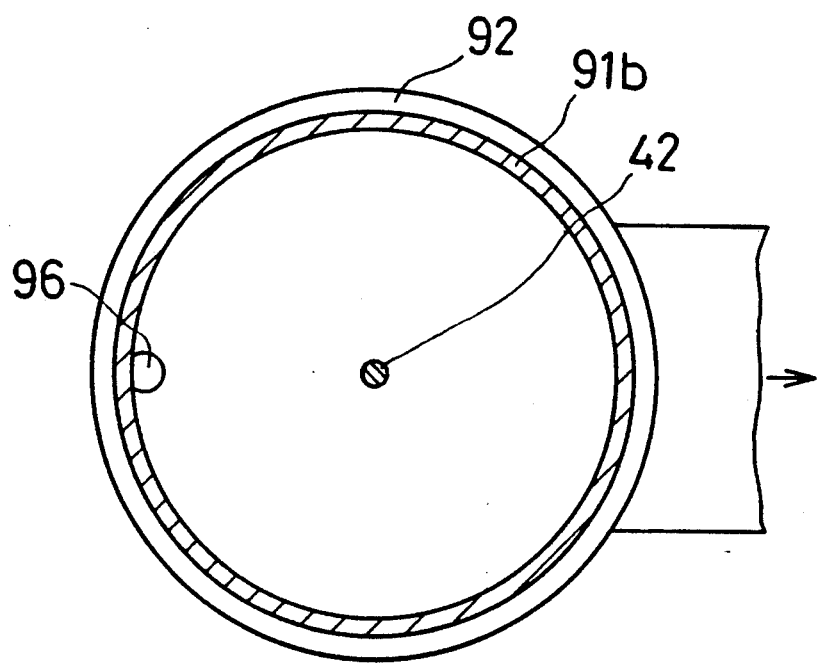
FIG. 23 is a cross sectional view of the exhaust gas purifying apparatus, and is viewed in the direction of the arrows "B—B" in FIG. 22.
Figure 24:
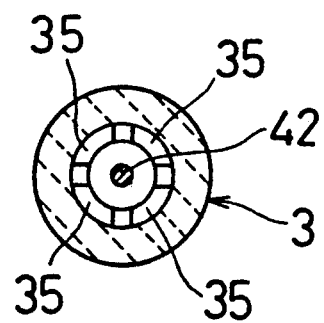
FIG. 24 is a cross sectional view of the exhaust gas purifying apparatus, and is viewed in the direction of the arrows "A—A" in FIG. 21.

FIGS. 21 through 24 illustrate a Ninth Preferred Embodiment of the exhaust gas purifying apparatus according to the present invention. FIG. 21 is a vertical cross sectional view of an upper part thereof, FIG. 22 is a vertical cross sectional view of a lower part thereof, FIG. 23 is a cross sectional view thereof viewed in the direction of the arrows "B—B" in FIG. 22, and FIG. 24 is a cross sectional view thereof viewed in the direction of the arrows "A—A" in FIG. 21. The apparatus is a large-sized and vertical version of the exhaust gas purifying apparatus for buses, tracks or the like, and comprises a fixed cylinder 91 having a smaller diameter at the top and a larger diameter at the middle and the bottom and opened at the bottom, a rotary cylinder 92 engaging with the bottom of the fixed cylinder 91 rotatably and opened at both ends, and a collector box 93 allowing the rotation of the rotary cylinder 92 and engaging with the bottom opening of the rotary cylinder 92.

At the top of the fixed cylinder 91, an insulator 3 having an air supply hole 35 is fixed. An electrode rod 42, constituting one of the pair of discharge electrode as well as one of the pair of collector electrodes, is disposed downward from the center of the bottom surface of the insulator 3 along the center line of the fixed cylinder 91. In a side surface of the fixed cylinder adjacent to the top, an ellipse-shaped opening 94 is formed. In the ellipse-shaped opening 94, a smaller-diameter front end 1c of an upstream-side exhaust pipe 1a is inserted. In a side surface of the fixed cylinder 92 adjacent to the bottom, a larger-diameter opening 95 is formed. In the larger-diameter opening 95, a downstream-side exhaust pipe 1b is inserted.

The fixed cylinder 91 includes a small-diameter portion 91a which is disposed immediately below the ellipse-shaped opening 94 and which has the smallest diameter in the fixed cylinder 91. An inner space of the small-diameter portion 91a constitutes the discharge space Sd. The small-diameter portion 91a constitutes another one of the pair of discharge electrode. Further, the fixed cylinder 91 includes a large-diameter portion 91b which is disposed below the small-diameter portion 91a and which has the largest diameter in the fixed cylinder 91. An inner space of the large-diameter portion 91b constitutes the collector space Sc. The large-diameter portion 91b constitutes another one of the pair of collector electrode.

The rotary cylinder 92 has a truncated cone shape at the bottom, and is rotated at a low speed by a speed reducing motor (not shown). On an inner surface of the rotary cylinder 92, a bar (i.e., a scraper) is disposed upward and vertically, and has a substantially long and continuous length. An outer periphery of the bar 96 is brought into contact with an inner surface of the large-diameter portion 91b of the fixed cylinder 91.

The operation of the exhaust gas purifying apparatus thus constructed will be hereinafter described. The smaller-diameter front end cylinder 1c of the upstream-side exhaust pipe 1a throttles and accelerates an exhaust gas. The exhaust gas is introduced into the discharge space Sd. Diesel particulates in the exhaust gas are charged by a corona discharge generated between the electrode rod 42 and the small-diameter portion 91a of the fixed cylinder 91 in the discharge space Sd. Then, the diesel particulates arrive in the collector space Sc at the bottom of the fixed cylinder 91. The diesel particulates are attracted by an electrostatic field generated in the collector space Sc, and deposit on the inner surface of the large-diameter portion 91b of the fixed cylinder 91.

As the rotary cylinder 92 rotates, the bar 96 rotates at a low speed while it contacts with the inner surface of the large-diameter portion 91b of the fixed cylinder 91. Accordingly, the diesel particulates layer depositing on the inner surface of the large-diameter portion 91b are dropped. The dropped diesel particulates are collected in the collector box 93. Thereafter, the collector box 93 is disassembled from the apparatus, and the diesel particulates can be removed from the collector box 93.

With the construction of the Ninth Preferred Embodiment, the diesel particulates layer can be inhibited from depositing excessively. Therefore, it is possible to down-size the large-diameter portion 91b of the fixed cylinder 91 and reduce the collector voltage consequently. It is also possible to operate the apparatus continuously.

As described above, the bar 96 can be rotated even when the diesel particulates are collected by applying electricity to the electrode rod 42. Accordingly, since the diesel particulates hardly deposit on the inner surface of the large-diameter portion 91b of the fixed cylinder 91, it is possible to down-size the large-diameter portion 91b in a radial direction. In addition, it is possible to throw away the diesel particulates depositing on the bar 96 itself by changing the rotary direction of the bar 96 suddenly.

Tenth Preferred Embodiment

Figure 25:
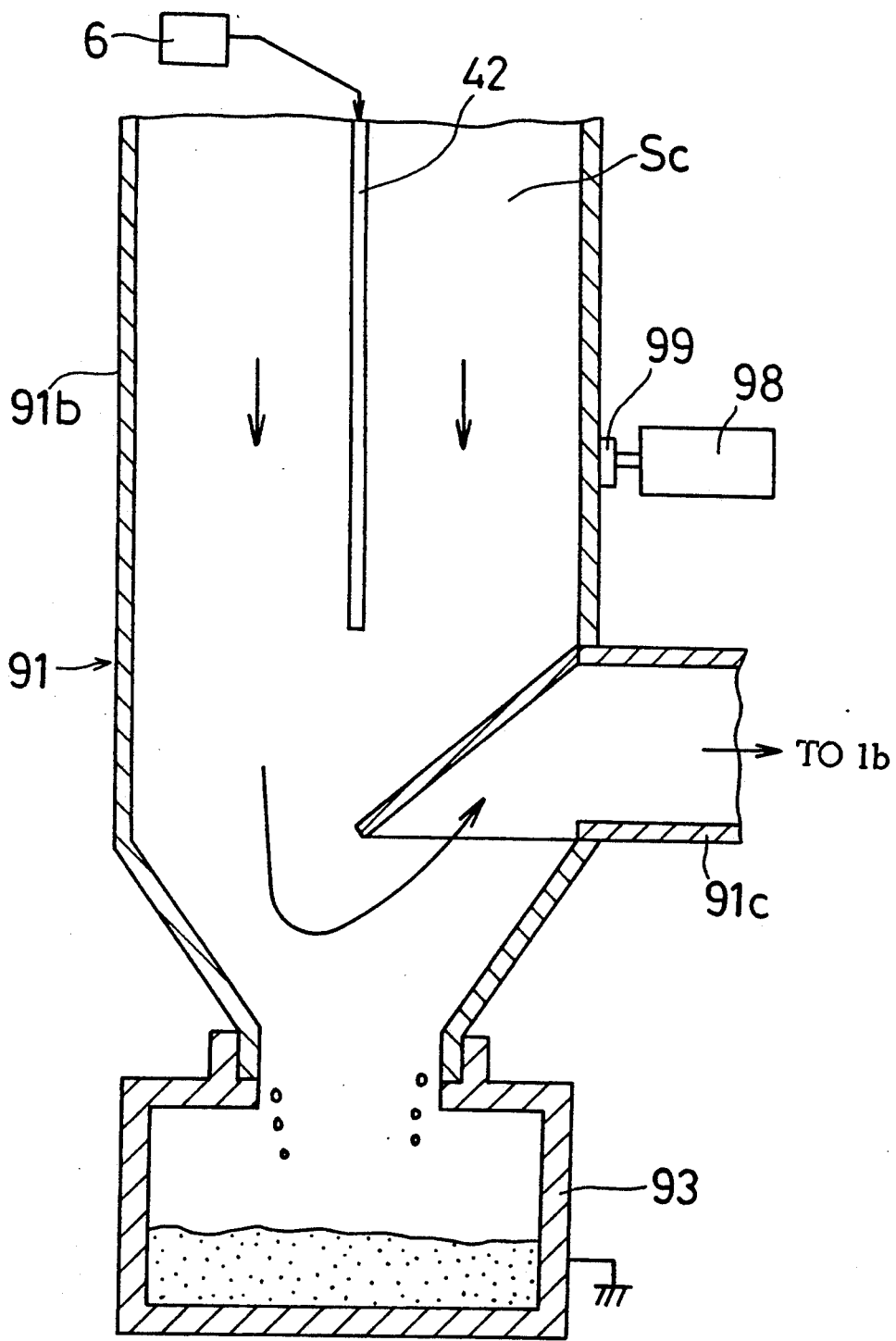
FIG. 25 is a vertical cross sectional view of a lower part of an exhaust gas purifying apparatus of a Tenth Preferred Embodiment according to the present invention.

FIG. 25 illustrates a Tenth Preferred Embodiment of the exhaust gas purifying apparatus according to the present invention. FIG. 25 is a vertical cross sectional view of a lower part thereof. An upper part thereof is identical with that of the Ninth Preferred Embodiment illustrated in FIG. 21.

The apparatus has an identical construction with that of the Ninth Preferred Embodiment except the lower part thereof (See FIG. 22.). Namely, unlike the Ninth Preferred Embodiment, the apparatus of the Tenth Preferred Embodiment has done away with the rotary cylinder 92, and a large-diameter portion 91b of a fixed cylinder 91 is formed so that it has a gradually reducing diameter toward the bottom. The bottom opening of the large-diameter portion 91b engages with a top opening of a collector box 93 directly. An exhaust pipe 91c penetrates the large-diameter portion 91b of the fixed cylinder 91 horizontally at the bottom. An inner end of the exhaust pipe 91c is opened downward, and an outer end thereof is connected to a downstream-side exhaust pipe 1b (not shown).

Further, a vibrator head 99 of a vibrator 98 is brought into contact with an outer peripheral surface of the large-diameter portion 91b of the fixed cylinder 91 so that the vibrator head 99 vibrates the fixed cylinder 91 when the vibrator 98 is actuated. The vibrator 98 has a built-in electromagnet, and vibrates the vibrator head 99 when electricity is applied to the electromagnet intermittently.

The operation of the exhaust gas purifying apparatus thus constructed will be hereinafter described. The discharge and collecting operations of the apparatus are identical with those of the Ninth Preferred Embodiment, and accordingly they will not be described herein.

In the apparatus, a pulsating current is applied to the electromagnet in the vibrator 98 after shutting off a voltage application to the electrode rod 42. As a result, the vibrator head 99 vibrates the fixed cylinder 91, thereby dropping the diesel particulates layer depositing on the inner surface of the fixed cylinder 91 into the collector box 93. Thereafter, the collector box 93 is disassembled from the apparatus, and the diesel particulates can be removed from the collector box 93.

With the construction of the Tenth Preferred Embodiment, the diesel particulates layer can be inhibited from depositing on the inner surface of the large-diameter portion 91b of the fixed cylinder 91 excessively. Therefore, it is possible to down-size the large-diameter portion 91b and reduce the collector voltage consequently. Further, the apparatuses of the Ninth and Tenth Preferred Embodiments may include a diesel particulates burner in the collector box 93.

Eleventh Preferred Embodiment

Figure 26:
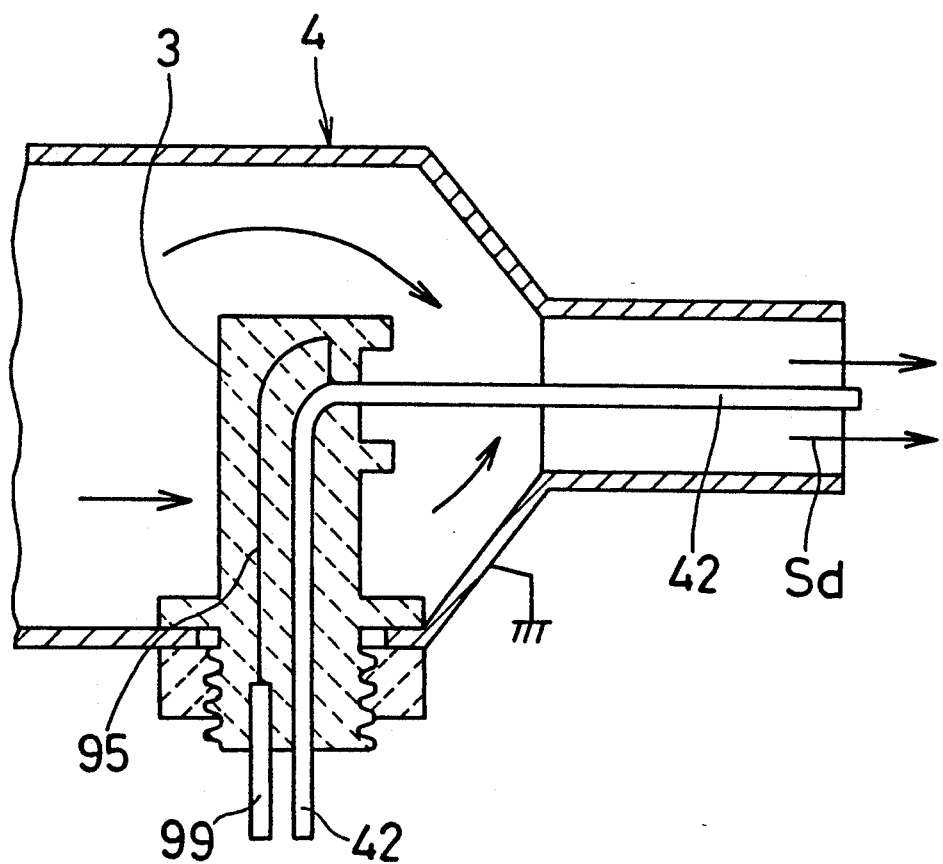
FIG. 26 is a vertical cross sectional view of a nozzle portion of an exhaust gas purifying apparatus of an Eleventh Preferred Embodiment according to the present invention.

FIG. 26 illustrates an Eleventh Preferred Embodiment of the exhaust gas purifying apparatus according to the present invention. FIG. 26 is a vertical cross sectional view of a nozzle portion 4 thereof. The apparatus includes a modified insulator construction of the nozzle portion 4 of the Fifth Preferred Embodiment illustrated in FIG. 14.

Namely, an insulator 3 of the Eleventh Preferred Embodiment includes a nichrome wire 95 buried therein at a position away from an electrode rod 42. An end of the nichrome wire 95 is connected to a terminal 99, and another end of the nichrome wire 95 is connected to the electrode rod 42 which has a low resistance.

When a voltage is applied between the terminal 99 and the electrode rod 42, the nichrome wire 95 is heated and the temperature of the insulator 3 is raised to a high temperature. Accordingly, the diesel particulates layer depositing on the insulator 3 is burned up, thereby recovering the insulation of the insulator 3.

Twelfth Preferred Embodiment

Figure 27:
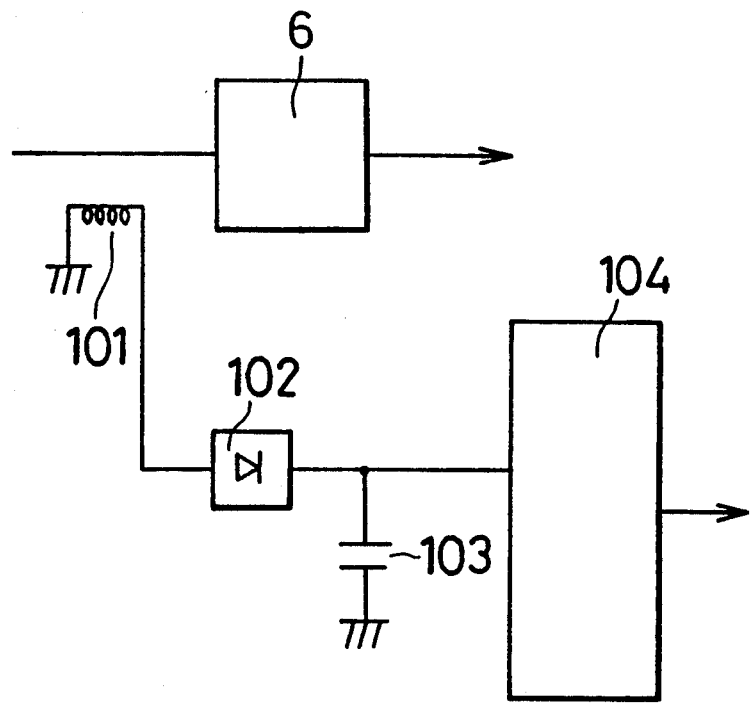
FIG. 27 is a block diagram illustrating a controller circuit of an exhaust gas purifying apparatus of a Twelfth Preferred Embodiment according to the present invention.
Figure 28:
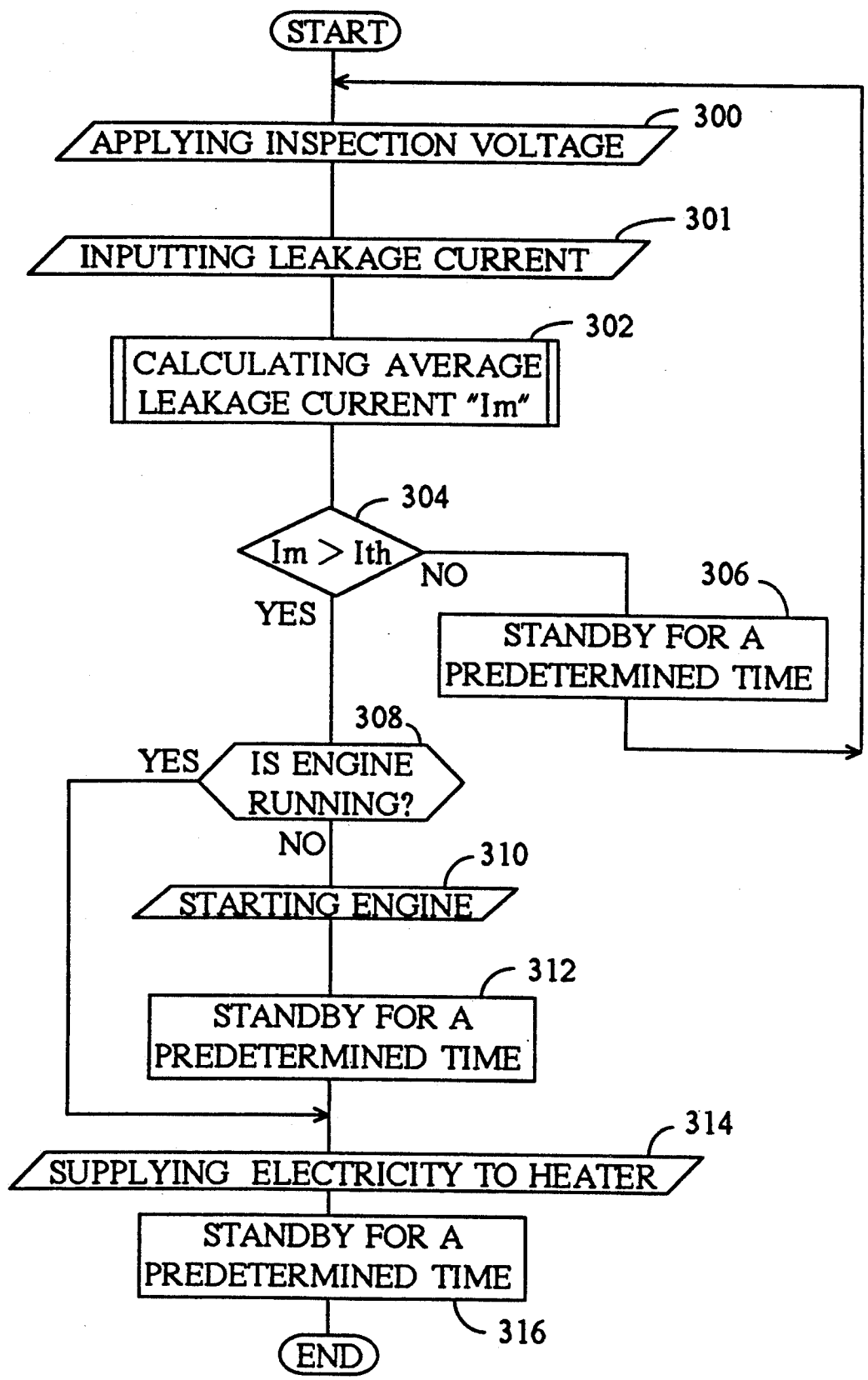
FIG. 28 is a flow chart illustrating operations of a controller of the exhaust gas purifying apparatus of the Twelfth Preferred Embodiment.

A Twelfth Preferred Embodiment of the apparatus according to the present invention will be hereinafter described with reference to a block circuit diagram illustrated in FIG. 27 and a flow chart illustrated in FIG. 28. FIG. 27 illustrates a controller circuit for controlling the current to be supplied to the nichrome wire 95 of the Eleventh Preferred Embodiment for burning up the diesel particulates depositing on the insulator 3, and FIG. 28 illustrates an operation sequence of a controller. The controller includes a current sensor 101, a detection circuit 102, a smoothing capacitor 103, and a micro-computer 104.

The electricity is supplied to the high voltage power source 6 by an alternator (not shown) actuated by a vehicle diesel engine, and a high DC voltage generated by the high voltage power source 6 is then applied to the electrode rod 42. The current sensor 101 senses the current supplied from the alternator to the high voltage power source 6. The sensed current is detected by the detection circuit 102, the detected current is smoothed by the smoothing capacitor 103, and finally the smoothed current is supplied to the micro-computer 104. Here, it is assumed that the high voltage power source 6 supplies electricity to the electrode rod 42 only.

The micro-computer 104 controls the electricity supply to the nichrome wire 95. The control operation will be hereinafter described with reference to the flow chart illustrated in FIG. 28.

At Step 300, the micro-computer 104 instructs the high voltage power source 6 to apply an inspection voltage, which is a fraction of the corona discharge voltage, to the electrode rod 42, and, at Step 301, it detects the current supplied to the high voltage power source 6 (hereinafter referred to as a leakage current) which is sensed by the current sensor 101. Then, at Step 302, the micro-computer 104 calculates an average leakage current "Im" in a predetermined period of time, and, at Step 304, it examines whether the leakage current "Im" is greater than a predetermined threshold current value "Ith." Most of the leakage current is the current flowing over the surface of the insulator 3. Therefore, as the diesel particulates, mainly containing carbon, deposit on the surface of the insulator 3, the insulation resistance of the insulator 3 decreases and accordingly the leakage current increases.

When "Im" is not greater than "Ith," the micro-computer 104 assumes that the diesel particulates deposit less on the insulator 3, waits for a predetermined period of time at Step 306, and then returns to Step 300. When "Im" is greater than "Ith," the micro-computer 104 assumes that the diesel particulates deposit heavily on the insulator 3, and examines whether the diesel engine is running at Step 308. When the diesel engine is not running, the micro-computer 104 starts the diesel engine at Step 310, waits for a predetermined period of time until the diesel engine warms up at Step 312, and then supplies electricity to the nichrome wire 95 buried in the insulator 3 to heat the insulator 3 and burn up the diesel particulates depositing thereon. Thereafter, at Step 316, the micro-computer 104 waits for a predetermined period of time enough to eliminate the diesel particulates layer depositing on the surface of the insulator 3. Since the diesel particulates having a high temperature flows around the insulator 3 when the diesel engine is running, it is advantageous for burning the diesel particulates. In addition, since the exhaust gas of the diesel engine contains a sufficient amount of oxygen components, there is no trouble for burning up the diesel particulates, and it is possible to supply a fresh air through an air compressor.

With the construction of the Twelfth Preferred Embodiment, it is possible to automatically detect the contamination of the insulator 3. Further, since the insulator 3 is heated when the micro-computer 104 determines that the contamination is heavy, there is no trouble for cleaning the insulator 3. Thus, the maintenance can be done with ease.

Thirteenth Preferred Embodiment

Figure 29:
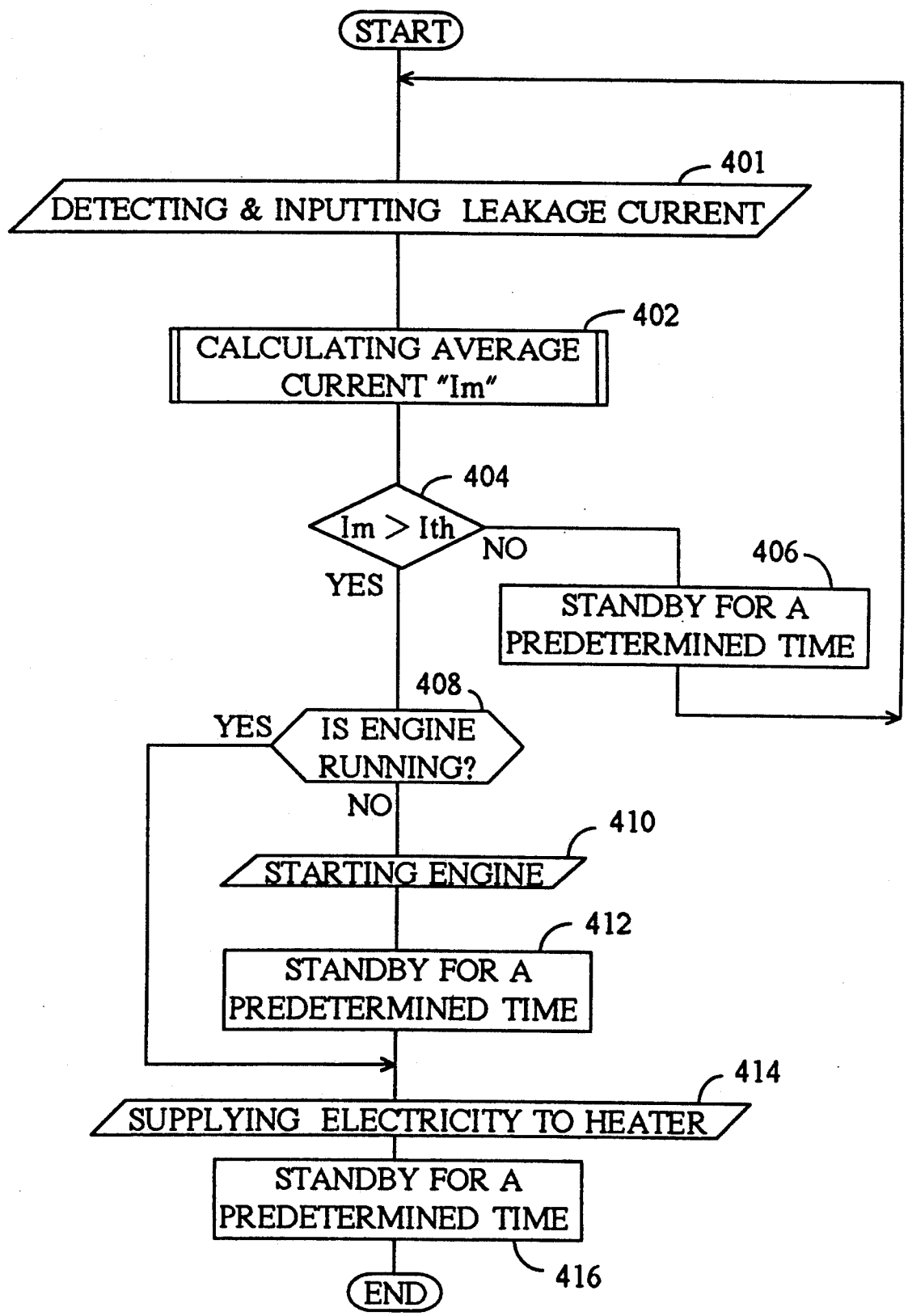
FIG. 29 is a flow chart illustrating operations of a controller of an exhaust gas purifying apparatus of a Thirteenth Preferred Embodiment according to the present invention.

A Thirteenth Preferred Embodiment of the apparatus according to the present invention will be hereinafter described with reference to the block circuit diagram illustrated in FIG. 27 and a flow chart illustrated in FIG. 29. In the Thirteenth Preferred Embodiment, the controller illustrated in FIG. 27 is a circuit for controlling the current to be supplied to the heater 100 of the Fifth Preferred Embodiment illustrated in FIGS. 11 and 13 so as to burn up the diesel particulates depositing on the collector electrodes 73. Other than the constructions described above, the controller has the same constructions as that of the Twelfth Preferred Embodiment. Namely, the current sensor 101 senses the current supplied to the high voltage power source 6. The sensed current is detected by the detection circuit 102, the detected current is smoothed by the smoothing capacitor 103, and finally the smoothed current is supplied to the micro-computer 104.

The micro-computer 104 controls the electricity supply to the heater 100. The control operation will be hereinafter described with reference to the flow chart illustrated in FIG. 29.

At Step 401, the micro-computer 104 detects the current supplied to the high voltage power source 6 when the high voltage power source 6 applies the collector voltage (i.e., the rated non-corona discharge voltage) to the collector electrodes 73. At Step 402, it calculates an average leakage current "Im" in a predetermined period of time, and, at Step 404, it examines whether the average leakage current "Im" is greater than a predetermined threshold current value "Ith." When the interval between the pairs of collector electrodes 73, 76 is reduced by the diesel particulates depositing on the collector electrodes 73, the electric field is enhanced and accordingly the leakage current increases. When the diesel particulates further deposit on the collector electrodes 73, the diesel particulates deposit more on the surface of the insulators 3 supporting the collector electrodes 73 simultaneously. Consequently, the current flowing over the surface of the insulators 3 increases, and the average leakage current "Im" increases.

When "Im" is not greater than "Ith," the micro-computer 104 assumes that the diesel particulates deposit less on the collector electrodes 73, waits for a predetermined period of time at Step 406, and then returns to Step 401. When "Im" is greater than "Ith," the micro-computer 104 assumes that the diesel particulates deposit heavily on the collector electrodes 73, and examines whether the diesel engine is running at Step 408. When the diesel engine is not running, the micro-computer 104 starts the diesel engine at Step 410, waits for a predetermined period of time until the diesel engine warms up at Step 412, and then supplies electricity to the heater 100 illustrated in FIGS. 11 and 13 to burn up the diesel particulates in the collector space Sc at Step 414. Thereafter, at Step S416, the micro-computer 104 waits for a predetermined period of time enough to eliminate the diesel particulates layer depositing on the surface of the collector electrodes 73. Since the heater 100 is disposed upstream to the collector space Sc as illustrated in FIG. 11, the burning of the diesel particulates quickly extends over the entire collector space Sc.

With the construction of the Thirteenth Preferred Embodiment, it is possible to automatically detect the degree of the diesel particulates deposition on the collector electrodes 73. Further, since the diesel particulates on the pairs of collector electrodes 73, 76 are burned when the micro-computer 104 determines that the deposition is heavy, there is no trouble for cleaning the pairs of collector electrodes 73, 76. Thus, the maintenance can be done with ease.

Although the apparatus of the Thirteenth Preferred Embodiment examines the deposition of the diesel particulates through the variation of the current supplied to the collector electrodes 73, it is naturally possible to detect the deposition with a pressure sensor through the exhaust gas pressure loss resulting from the deposition or through the variation of the diesel engine operation.

Fourteenth Preferred Embodiment

Figure 30:
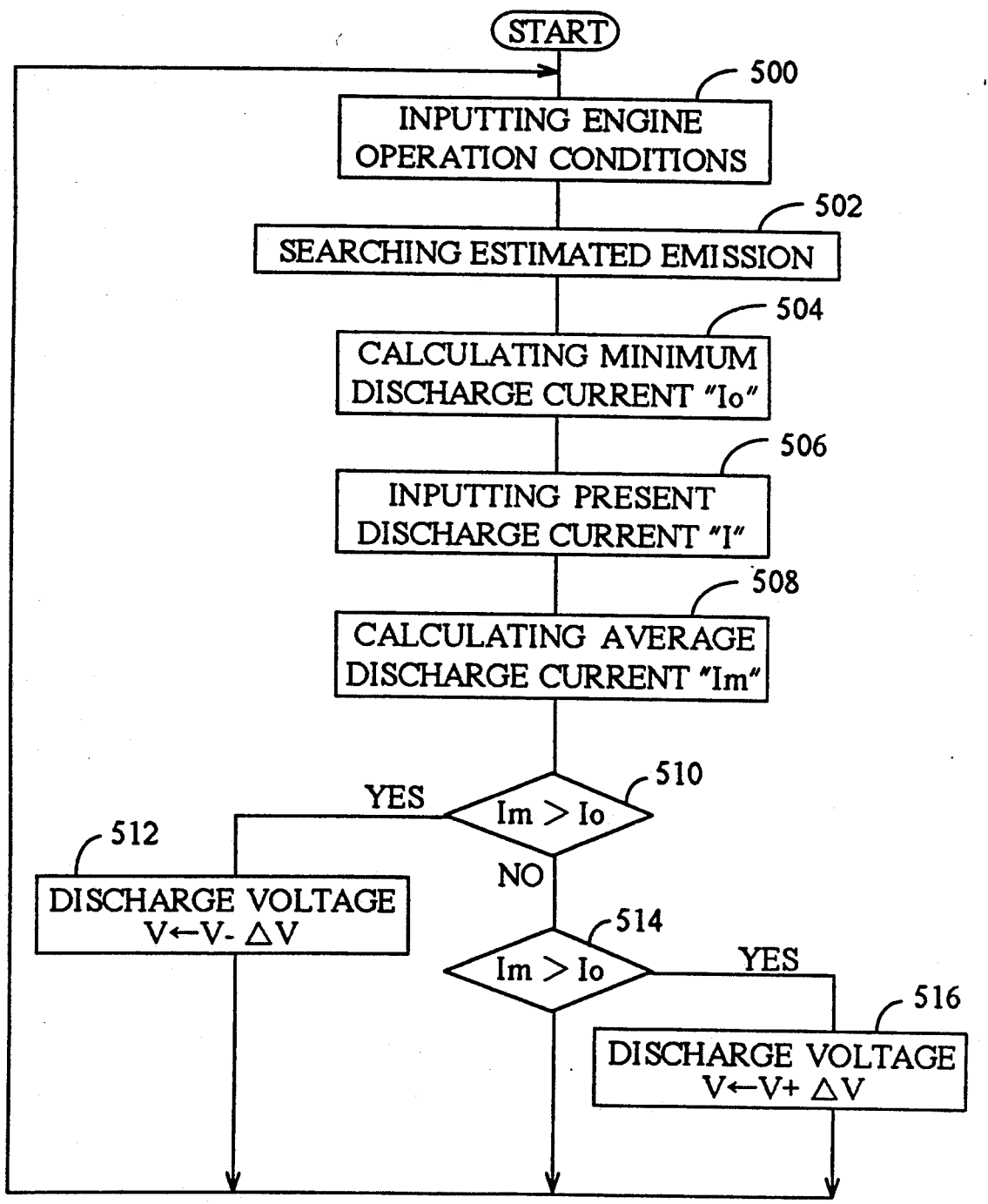
FIG. 30 is a flow chart illustrating operations of a controller of an exhaust gas purifying apparatus of a Fourteenth Preferred Embodiment according to the present invention.

A Fourteenth Preferred Embodiment of the apparatus according to the present invention will be hereinafter described with reference to a flow chart illustrated in FIG. 30. In the Fourteenth Preferred Embodiment, a modified version of the controller shown in FIG. 27 is employed.

At Step 500, the micro-computer 104 examines the operating conditions of the diesel engine, in particular, it examines the operating conditions relating to the diesel particulates emission amount. As for the operating conditions relating to the diesel particulates emission amount, there are the coolant temperature, the fuel injection amount, the speed (i.e., the load) or the like. The diesel particulates emission amount varying in accordance with the operating conditions are stored in a memory unit of the micro-computer 104 as a map in advance.

Then, at Step 502, the micro-computer 104 searches an estimated diesel particulates emission amount in accordance with the operating conditions examined, and, at Step 504, it calculates a minimum discharge current "Io" (i.e., an optimum discharge current), which enables to purify the diesel particulates in the estimated emission amount at a predetermined conversion, in accordance with the map stored in the memory unit. Here, an equal voltage (hereinafter referred to as discharge voltage) is applied to the pair of discharge electrodes and the pair of collector electrodes, and the discharge current is a sum of the currents supplied to the pairs of electrodes.

Further, at step 506, the micro-computer 104 applies a predetermined voltage to the pair of discharge electrodes and the pair of the collector electrodes in order to charge and collect the diesel particulates, and then it detects a present discharge current during the charging and collecting. At step 508, the micro-computer 104 calculates an average present discharge current.

Then, at step 510, the micro-computer 104 compares the average present discharge current "Im" with the minimum discharge current "Io." When "Im" is greater than "Io," the micro-computer 104 assumes that the "Im" is excessive, and reduces the discharge voltage "V" by "$\Delta V$." When "Im" is not greater than "Io," the micro-computer 104 examines whether "Im" is less than "Io" at step 514. When "Im" is less than "Io," the micro-computer 104 assumes that the "Im" is too small, and increases the discharge voltage "V" by "$\Delta V$" at step 516. When "Im" is not less than "Io," the micro-computer 104 returns to step 500, and repeats the routine operation.

In the Fourteenth Preferred Embodiment, since the discharge current is varied in an optimum range in accordance with the variation of the diesel particulates emission amount, the discharge current is not supplied more than necessary when the diesel particulates are emitted less. Consequently, the electrodes do not break, the electricity consumption does not increase, and the Nox emission does not increase. Further, the discharge current is not supplied less than necessary when the diesel particulates are emitted more. Consequently, the conversion of the diesel particulates does not deteriorate.

Having now fully described the present invention, it will be apparent to one of ordinary skill in the art that many changes and modifications can be made thereto without departing from the spirit or scope of the present invention as set forth herein including the appended claims.

What is claimed is:

1. An exhaust gas purifying apparatus for an automobile diesel engine comprising:
    a pair of electrodes disposed at intervals in an exhaust path of an automobile diesel engine;
    a high voltage power source for applying a high voltage to said pair of electrodes whereby an electric field is generated in a space between said pair of electrodes so as to collect diesel particulates,
    a current detecting means for detecting current flowing out from at least one of said pair of electrodes,
    a deciding means for deciding a volume of collected particulates on at least one of said electrodes and an insulator for insulating said at least one electrode, and,
    a particulates eliminating means for eliminating particulates when said collected particulates on said at least one electrode and said insulator exceed a predetermined threshold level.

2. An exhaust gas purifying apparatus for an automobile diesel engine according to claim 1 further comprising,
    an applied voltage control means for eliminating said applied voltage applied between said pair of electrodes when said current exceeds a predetermined threshold level.

3. An exhaust gas purifying apparatus for an automobile diesel engine according to claim 1,
    wherein said particulates eliminating means comprises a vibrator for vibrating said at least one electrode.

4. An exhaust gas purifying apparatus for an automobile diesel engine according to claim 1,
    wherein said particulates eliminating means comprises a rotary scraper for scraping particulates collected on said electrodes.

5. An exhaust gas purifying apparatus for an automobile diesel engine according to claim 3 or 4 further comprising,
    a collector container detachably installed to a lower part of said electrodes and having a container like shape.

6. An exhaust gas purifying apparatus for an automobile diesel engine according to claim 1,
    wherein said particulates eliminating means comprises a burning means for burning particulates collected on said electrodes.

* * * * *